(12) United States Patent
Asano et al.

(10) Patent No.: US 11,592,778 B2
(45) Date of Patent: Feb. 28, 2023

(54) IMAGE FORMING APPARATUS AND IMAGE FORMING SYSTEM INCORPORATING THE IMAGE FORMING APPARATUS

(71) Applicants: Sho Asano, Kanagawa (JP); Wataru Takahashi, Tokyo (JP); Yoshito Suzuki, Chiba (JP); Shinya Monma, Kanagawa (JP); Joji Akiyama, Kanagawa (JP); Yohsuke Haraguchi, Kanagawa (JP); Wataru Nozaki, Kanagawa (JP); Tomohiro Furuhashi, Kanagawa (JP)

(72) Inventors: Sho Asano, Kanagawa (JP); Wataru Takahashi, Tokyo (JP); Yoshito Suzuki, Chiba (JP); Shinya Monma, Kanagawa (JP); Joji Akiyama, Kanagawa (JP); Yohsuke Haraguchi, Kanagawa (JP); Wataru Nozaki, Kanagawa (JP); Tomohiro Furuhashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/363,187

(22) Filed: Jun. 30, 2021

(65) Prior Publication Data

US 2022/0011712 A1 Jan. 13, 2022

(30) Foreign Application Priority Data

Jul. 7, 2020 (JP) .............................. JP2020-117089

(51) Int. Cl.
*G03G 15/00* (2006.01)
*B41M 7/00* (2006.01)

(52) U.S. Cl.
CPC ....... *G03G 15/6582* (2013.01); *B41M 7/0027* (2013.01)

(58) Field of Classification Search
CPC combination set(s) only.
See application file for complete search history.

(56) References Cited

U.S. PATENT DOCUMENTS

2005/0042007 A1* 2/2005 Fujii ...................... G03G 15/50
399/407
2006/0204253 A1* 9/2006 Mae ................... G03G 15/6594
399/21

(Continued)

FOREIGN PATENT DOCUMENTS

JP 9-150456 6/1997
JP 9-164593 6/1997

(Continued)

*Primary Examiner* — Jennifer Bahls
(74) *Attorney, Agent, or Firm* — Harness, Dickey & Pierce, P.L.C.

(57) ABSTRACT

An image forming apparatus includes a sheet separation device, a first sheet feeder, a second sheet feeder, an image forming device, and circuitry. The sheet separation device is configured to separate a non-bonding portion of a two-ply sheet in which two sheets are overlapped and bonded together at a bonding portion of the two-ply sheet. The first sheet feeder is configured to feed the two-ply sheet. The second sheet feeder is configured to feed an inner sheet to be inserted between the two sheets. The image forming device is configured to form an image on a surface of the inner sheet. The circuitry is configured to cause the first sheet feeder to feed the two-ply sheet, perform a sheet separating operation on the two-ply sheet and cause the second sheet feeder to start feeding the inner sheet before completion of the sheet separating operation on the two-ply sheet.

17 Claims, 16 Drawing Sheets

(56) References Cited

U.S. PATENT DOCUMENTS

| | | | |
|---|---|---|---|
| 2007/0040328 A1* | 2/2007 | Hattori | G03G 15/6573 271/293 |
| 2007/0161489 A1* | 7/2007 | Ikeda | B42C 1/12 493/417 |
| 2008/0223515 A1* | 9/2008 | Sudo | G03G 15/6582 156/289 |
| 2011/0073234 A1* | 3/2011 | Lee | B32B 37/142 156/364 |
| 2015/0125198 A1* | 5/2015 | Sekigawa | B65H 31/26 399/407 |
| 2018/0257900 A1 | 9/2018 | Suzuki et al. | |
| 2019/0010011 A1 | 1/2019 | Watanabe et al. | |
| 2019/0276263 A1 | 9/2019 | Hidaka et al. | |
| 2019/0284008 A1 | 9/2019 | Sakano et al. | |
| 2019/0284009 A1 | 9/2019 | Suzuki et al. | |
| 2019/0284010 A1 | 9/2019 | Asami et al. | |
| 2019/0284011 A1 | 9/2019 | Furuhashi et al. | |
| 2019/0284012 A1 | 9/2019 | Yoneyama et al. | |
| 2019/0367317 A1 | 12/2019 | Haraguchi et al. | |
| 2020/0140222 A1 | 5/2020 | Takahashi et al. | |
| 2020/0239265 A1 | 7/2020 | Suzuki et al. | |
| 2020/0247107 A1 | 8/2020 | Morinaga et al. | |
| 2020/0247636 A1 | 8/2020 | Furuhashi et al. | |
| 2020/0270093 A1 | 8/2020 | Suzuki et al. | |
| 2020/0338877 A1 | 10/2020 | Takahashi et al. | |
| 2020/0341414 A1 | 10/2020 | Watanabe et al. | |
| 2020/0385231 A1 | 12/2020 | Kunieda et al. | |
| 2020/0407187 A1 | 12/2020 | Hidaka et al. | |
| 2021/0039900 A1 | 2/2021 | Shimazu et al. | |
| 2021/0039916 A1 | 2/2021 | Sugiyama et al. | |

FOREIGN PATENT DOCUMENTS

| | | |
|---|---|---|
| JP | 2006-160429 | 6/2006 |
| JP | 2016-161744 | 9/2016 |

* cited by examiner

IMAGE FORMING APPARATUS AND IMAGE FORMING SYSTEM INCORPORATING THE IMAGE FORMING APPARATUS

CROSS-REFERENCE TO RELATED APPLICATION

This patent application is based on and claims priority pursuant to 35 U.S.C. § 119(a) to Japanese Patent Application No. 2020-117089, filed on Jul. 7, 2020, in the Japan Patent Office, the entire disclosure of which is hereby incorporated by reference herein.

BACKGROUND

Technical Field

Embodiments of the present disclosure relate to an image forming apparatus such as a copier, a printer, a facsimile machine, or a multi-functional apparatus including at least two functions of the copier, the printer, and the facsimile machine, and an image forming system incorporating the image forming apparatus.

Background Art

Various types of sheet separators (i.e., sheet lamination devices) are known to separate a two-ply sheet in which two sheets are overlapped and bonded together at a bonding portion on one end of the two-ply sheet.

Specifically, a known sheet lamination device (the sheet separator) includes the sheet lamination device (the sheet separator) that separates two sheets of a laminated sheet that is a two-ply sheet in which one sides of the two sheets are bonded at one end of the two-ply sheet and inserts protective paper that is an inner sheet between the two sheets.

SUMMARY

Embodiments of the present disclosure described herein provide a novel image forming apparatus including a sheet separation device, a first sheet feeder, a second sheet feeder, an image forming device, and circuitry. The sheet separation device is configured to separate a non-bonding portion of a two-ply sheet in which two sheets are overlapped and bonded together at one end as a bonding portion of the two-ply sheet. The first sheet feeder is configured to feed the two-ply sheet. The second sheet feeder is configured to feed an inner sheet to be inserted between the two sheets of the two-ply sheet in a state in which the non-bonding portion of the two-ply sheet is separated by the sheet separation device. The image forming device is configured to form an image on a surface of the inner sheet fed from the second sheet feeder in a sheet conveyance direction. The circuitry is configured to cause the first sheet feeder to feed the two-ply sheet, perform a sheet separating operation on the two-ply sheet to separate the non-bonding portion of the two-ply sheet, and cause the second sheet feeder to start feeding the inner sheet before completion of the sheet separating operation on the two-ply sheet.

Further, embodiments of the present disclosure described herein provide an image forming system including the above-described image forming apparatus and a sheet separator. The image forming apparatus includes a housing including the image forming device and the second sheet feeder. The sheet separator includes the sheet separation device and the first sheet feeder. The sheet separator is detachably attached to the image forming apparatus.

BRIEF DESCRIPTION OF THE SEVERAL VIEWS OF THE DRAWINGS

Exemplary embodiments of this disclosure will be described in detail based on the following figures, wherein:

FIG. 14 including

Figure 1:
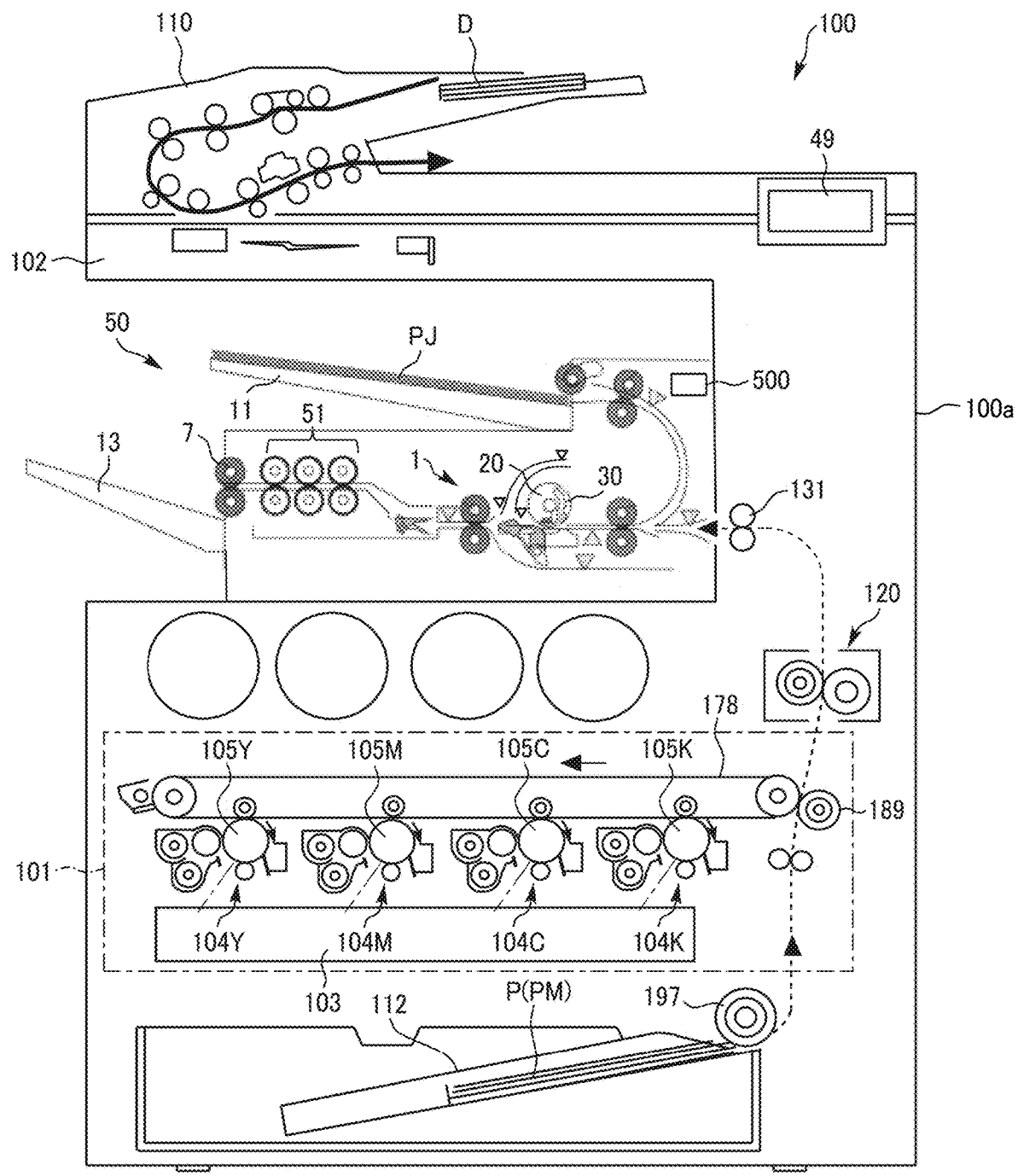
FIG. 1 is a schematic view illustrating the overall configuration of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

It will be understood that if an element or layer is referred to as being "on," "against," "connected to" or "coupled to" another element or layer, then it can be directly on, against, connected or coupled to the other element or layer, or intervening elements or layers may be present. In contrast, if an element is referred to as being "directly on," "directly connected to" or "directly coupled to" another element or layer, then there are no intervening elements or layers present. Like numbers referred to like elements throughout. As used herein, the term "and/or" includes any and all combinations of one or more of the associated listed items.

Spatially relative terms, such as "beneath," "below," "lower," "above," "upper" and the like may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements describes as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors herein interpreted accordingly.

The terminology used herein is for describing particular embodiments and examples and is not intended to be limiting of exemplary embodiments of this disclosure. As used herein, the singular forms "a," "an," and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

Referring now to the drawings, embodiments of the present disclosure are described below. In the drawings for explaining the following embodiments, the same reference codes are allocated to elements (members or components) having the same function or shape and redundant descriptions thereof are omitted below.

Next, a description is given of a configuration and functions of an image forming apparatus, and an image forming system, according to an embodiment of the present disclosure, with reference to drawings. Note that identical parts or equivalents are given identical reference numerals and redundant descriptions are summarized or omitted accordingly.

Now, a description is given of the configuration and functions of an image forming apparatus 100 according to an embodiment of the present disclosure, with reference to FIG. 1.

FIG. 1 is a schematic view illustrating the overall configuration of an image forming apparatus 100 according to an embodiment of the present disclosure.

As illustrated in FIG. 1, the image forming apparatus 100 according to the present embodiment includes a sheet separator 50 having a function of sheet lamination in the inner body of the image forming apparatus 100. To be more specific, the inner body of the image forming apparatus 100 is a space between a document reading device 102 and an image forming device 101. That is, the document reading device 102 that reads image information of the original document D is disposed above the image forming device 101 with space. The sheet separator 50 (having a sheet separation device 1) is disposed in the space between the document reading device 102 and the image forming device 101.

The image forming apparatus 100 further includes a housing 100a that is a main body of the image forming apparatus 100. The housing 100a of the image forming apparatus 100 is mainly provided with the image forming device 101, the main sheet feed tray 112 that functions as a second sheet feeder, a fixing device 120 that functions as a heat source, a document feeder 110, and a document reading device 102.

The sheet separator 50 mainly includes a unit sheet feed tray 11 that functions as a first sheet feeder, a sheet separation device 1, a sheet lamination device 51, and an ejection tray 13.

The sheet separation device 1 separates a non-bonding portion of a two-ply sheet PJ in which two sheets P1 and P2 are overlapped and bonded together at one end of the two-ply sheet PJ as a bonding portion A of the two-ply sheet PJ (see FIGS. 11A to 11E and other drawings). The sheet separation device 1 includes a winding roller 20, a third conveyance roller pair 6, and a moving mechanism 30. Details of the sheet separation device 1 are described below, with reference to FIG. 2 and other drawings. The sheet separation device 1 further includes a controller 500 that controls sheet conveyance of the sheet (i.e., the two-ply sheet PJ and the insertion sheet PM) by performing, e.g., a sheet separating operation, a sheet laminating operation, and a sheet inserting operation. The controller 500 is connected to various drivers driving various parts and units, for example, the above-described parts and units included in the sheet separation device 1.

The unit sheet feed tray 11 functions as a first sheet feeder to feed the two-ply sheet PJ toward the sheet separation device 1. As the two-ply sheet PJ, a laminated sheet that is bonded with another sheet by heat is used.

The sheet lamination device 51 performs sheet lamination on the two-ply sheet PJ in a state in which an inner sheet PM is inserted between two sheets, which are a first sheet P1 and a second sheet P2, separated from each other by the sheet separation device 1. In other words, the sheet lamination device 51 applies heat and pressure on the non-bonding portion of the two sheets (i.e., the first sheet P1 and the second sheet P2 constructing the two-ply sheet PJ) to bond the two sheets together in a state in which the inner sheet PM on which a desired image is printed in by the image forming device 101 included in the housing 100a of the image forming apparatus 100 as described below. The sheet lamination device 51 is disposed downstream from the sheet separation device 1 in the sheet conveyance direction, that is, the downstream side in the forward direction and the left side in FIG. 2. The sheet lamination device 51 includes a plurality of heat and pressure roller pairs aligned in the sheet conveyance direction. Each of the plurality of heat and pressure roller pairs applies heat and pressure to the two-ply sheet PJ while conveying the two-ply sheet PJ in the forward direction with the inner sheet PM being inserted in the two-ply sheet PJ. Further, a fourth sheet conveyance passage K6 is disposed between the third conveyance roller pair 6 and the sheet lamination device 51.

The ejection tray 13 is a tray on which the two-ply sheet PJ (and the inner sheet PM) is stacked when the two-ply sheet PJ after the sheet laminating operation is ejected from the sheet separator 50 (of the image forming apparatus 100).

The sheet separation device 1, the unit sheet feed tray 11, the sheet lamination device 51, and the ejection tray 13 are included in a single unit as the sheet separator 50. The sheet separator 50 is disposed on the outside of the housing 100a of the image forming apparatus 100 (i.e., the inner body of the image forming apparatus 100) so as to be exposed outside. Therefore, a user can directly take out the two-ply sheet PJ (and the inner sheet PM) from the ejection tray 13 after the sheet laminating operation is performed on the two-ply sheet PJ (and the inner sheet PM) and the two-ply sheet PJ (and the inner sheet PM) is ejected to the ejection tray 13.

On the other hand, the main sheet feed tray 112 is detachably attached to the housing 100a of the image forming apparatus 100. The main sheet feed tray 112 functions as a second sheet feeder to feed the inner sheet PM toward the image forming device 101. The inner sheet PM is a sheet such as a paper sheet to be inserted between the two sheets (the first sheet P1 and the second sheet P2) of the two-ply sheet PJ in a state in which the non-bonding portion of the two-ply sheet PJ is separated in the sheet separation device 1.

The image forming device 101 forms an image (toner image) on the surface of the inner sheet PM that is fed from the main sheet feed tray 112 (functioning as a second sheet feeder) and is conveyed in a predetermined sheet conveyance direction that is a direction indicated by arrow with a broken line in FIG. 1. The image forming device 101 includes a plurality of image forming units 104Y, 104M, 104C, and 104K. In particular, the image forming device 101 according to the present embodiment forms an image with toner (e.g., dry toner), on the surface of the inner sheet PM. That is, the image forming apparatus 100 according to the present embodiment is an electrophotographic image forming apparatus.

The fixing device 120 that functions as a heat source is disposed downstream from the image forming device 101 in the sheet conveyance direction (of the inner sheet PM). The fixing device 120 fixes the image formed with toner (toner image) on the surface of the inner sheet PM, to the inner sheet PM. The fixing device 120 includes a fixing roller and a pressure roller. The fixing roller has a heater inside the fixing roller. The pressure roller is pressed in contact with the fixing roller, forming a fixing nip region with the fixing roller. The fixing device 120 heats and presses the toner image on the surface of a sheet that is conveyed to the fixing nip region, to fix the toner image to the surface of the sheet.

The image forming device 101, the main sheet feed tray 112 (functioning as a second sheet feeder), and the fixing device 120 are included in the housing 100a of the image forming apparatus 100.

Here, as illustrated in FIG. 1, in the present embodiment, the sheet separation device 1 (of the sheet separator 50) is disposed downstream from the image forming device 101 in the sheet conveyance direction of the inner sheet PM. To be more specific, the sheet separator 50 is disposed so as to receive the inner sheet PM ejected from an ejection roller pair 131 that is provided in the housing 100a of the image forming apparatus 100.

To be more specific, the two-ply sheet PJ does not pass through the housing 100a of the image forming apparatus 100 according to the present embodiment and is directly conveyed from the unit sheet feed tray 11 (the first sheet feeder) toward the sheet separation device 1 in the sheet separator 50.

According to this configuration, an operation to feed the inner sheet PM from the main sheet feed tray 112 and form an image on the inner sheet PM is performed concurrently with an operation in which to feed the two-ply sheet PJ from the unit sheet feed tray 11 and separate the two-ply sheet PJ. Therefore, the time that takes to finish inserting the inner sheet PM into the two-ply sheet PJ is reduced, thereby enhancing the print productivity of the image forming apparatus 100.

According to this configuration, the image forming apparatus 100 is reduced in size, when compared with a configuration in which the image forming apparatus 100 includes the sheet separation device 1 and space for temporarily retaining the inner sheet PM with the image formed on the surface, inside the housing 100a of the image forming apparatus 100.

Further, the two-ply sheet PJ does not pass through the fixing device 120 that functions as a heat source and the non-bonding portion of the two-ply sheet PJ is separated by the sheet separation device 1. In this state, the two-ply sheet PJ receives the inner sheet PM that has passed through the fixing device 120 in which the image on the surface of the inner sheet PM is fixed to the inner sheet PM. Accordingly, the above-described configuration prevents the sheet separation failure from causing the bonding of the two-ply sheet PJ by heat before the inner sheet PM is inserted into the two-ply sheet PJ.

Note that, in the present embodiment, the above-described mode in which the inner sheet PM is inserted into the two-ply sheet PJ to perform the sheet laminating operation is referred to as a "sheet lamination mode." Apart from the lamination mode, a "regular print mode" is also selectable.

The regular print mode is a control mode to eject a sheet P such as a paper material to the outside of the housing 100a of the image forming apparatus 100 without performing the sheet laminating operation. In the regular print mode, the two-ply sheet PJ is not fed from the unit sheet feed tray 11 (first sheet feeder), a sheet P such as a paper material fed from the main sheet feed tray 112 (second sheet feeder), the image forming device 101 forms an image on the surface of the sheet P, and the sheet P is conveyed via the fixing device 120 (heat source) to the outside of the housing 100a of the image forming apparatus 100.

Figure 12:
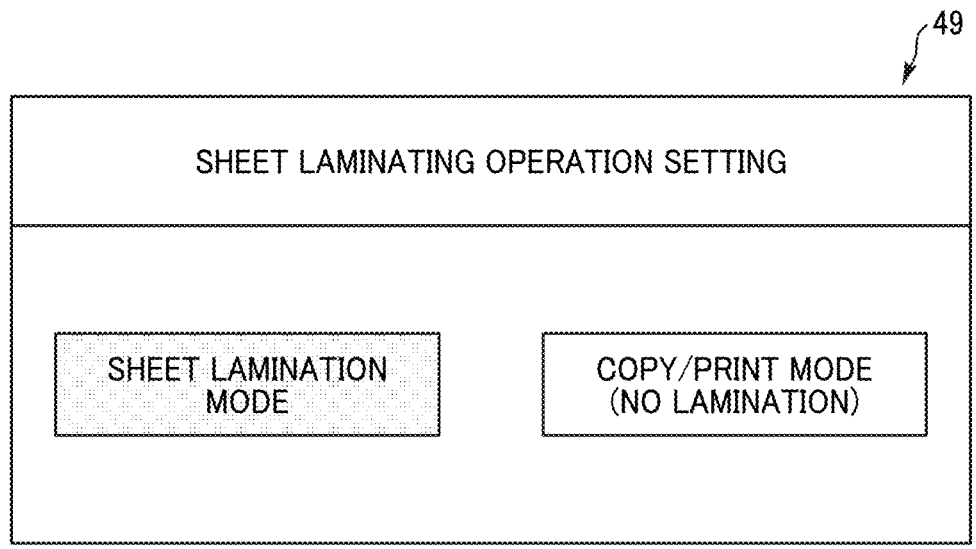
FIG. 12 is a diagram illustrating an example of display on an operation display panel.

In the present embodiment, a user operates an operation display panel 49 to display a window with "SHEET LAMINATING OPERATION SETTING" as illustrated in FIG. 12. The "copy/print mode" button (that is, the "COPY/PRINT MODE (NO LAMINATION) button) is selected when executing the regular print mode. The "sheet lamination mode" button (that is, the "SHEET LAMINATION MODE" button) is selected when executing the sheet lamination mode. Then, when the regular print mode is executed, even after the sheet P is ejected from the housing 100a of the image forming apparatus 100 and conveyed to the sheet separator 50, the sheet inserting operation to the two-ply sheet PJ and the sheet laminating operation are not performed on the sheet P, but the sheet P is ejected from the sheet separator 50 to be placed on the ejection tray 13.

Hereinafter, a description is given of the image forming operation (printing operation) in the image forming apparatus 100, with reference to FIG. 1.

In the image forming apparatus 100 with reference to FIG. 1, multiple pairs of sheet conveying rollers disposed in a document feeder 110 feed an original document D from a document loading table and convey the original document D in a direction indicated by arrow in FIG. 1. By so doing, the original document D passes over a document reading device 102. At this time, the document reading device 102 optically reads image data of the original document D passing over the document reading device 102.

The image data optically read by the document reading device 102 is converted into electrical signals and transmitted to a writing device 103. The writing device 103 emits laser beams onto photoconductor drums 105Y, 105M, 105C, and 105K, based on the electrical signals of the image data in each of colors, respectively. By so doing, an exposure process is executed by the writing device 103.

On the photoconductor drums 105Y, 105M, 105C, and 105K of respective image forming units 104Y, 104M, 104C, and 104K, a charging process, the exposure process, and a developing process are executed to form desired images on the photoconductor drums 105Y, 105M, 105C, and 105K, respectively.

The images formed on the photoconductor drums 105Y, 105M, 105C, and 105K are transferred and superimposed onto an intermediate transfer belt 178 to form a color image. The color image formed on the intermediate transfer belt 178 is transferred onto the surface of the sheet P (which is a sheet to function as the inner sheet PM) fed and conveyed by a sheet feed roller 197 from the main sheet feed tray 112 (second sheet feeder) at a position at which the intermediate transfer belt 178 faces a secondary transfer roller 189.

After the color image is transferred onto the surface of the sheet P (that is, the inner sheet PM), the sheet P is conveyed to the position of the fixing device 120 that functions as a heat source. The fixing device 120 fixes the transferred color image on the surface of the sheet P, to the sheet P.

Thereafter, the sheet P is ejected from the housing 100a of the image forming apparatus 100 by the ejection roller pair 131, and is fed as the inner sheet PM, into the sheet separator 50. At this time, the sheet separator 50 has substantially completed the operation described with reference to FIGS. 5A to 8C (that is, the operation to separate the two-ply sheet PJ) and performs the operation described with reference to FIGS. 9A to 9C (that is, the operation to insert the inner sheet PM into the two-ply sheet PJ) after the sheet separator 50 receives the inner sheet PM. Further, after the sheet lamination device 51 has completed the sheet laminating operation on the two-ply sheet PJ in which the inner sheet PM is inserted, the ejection roller pair 7 ejects the two-ply sheet PJ to the outside of the sheet lamination device 51 to stack the two-ply sheet PJ on the ejection tray 13.

As described above, a series of image forming operations (i.e., the printing operations) in the image forming apparatus 100 and a series of sheet separating operation of the two-ply sheet PJ and the sheet laminating operation of the inner sheet PM on which the image is formed are completed.

Note that the operation in the sheet lamination mode has been described above, but the operation in the regular print mode is substantially same as the operation in the sheet lamination mode, except that the operation performed in the sheet separator 50 is not performed on the sheet P in the regular print mode.

Figure 2:
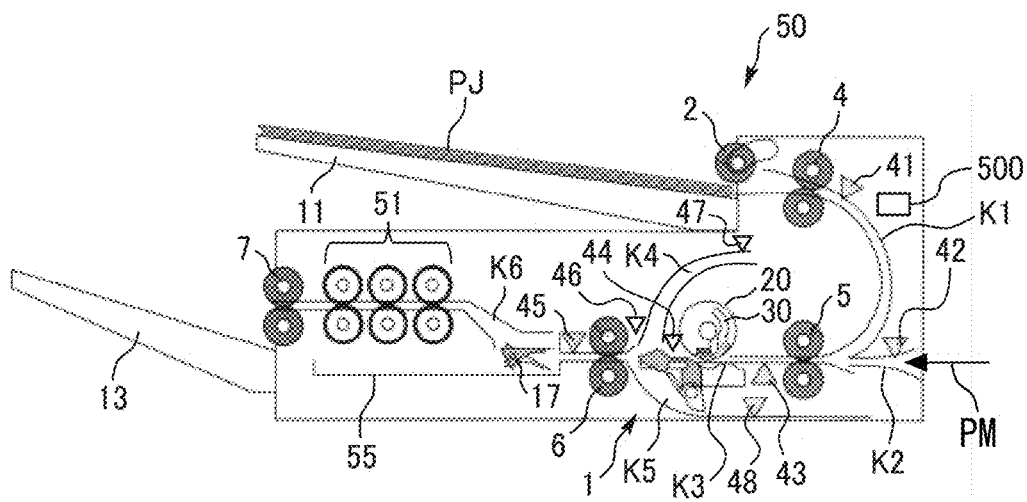
FIG. 2 is a diagram illustrating a sheet separator included in the image forming apparatus of FIG. 1.

Next, a description is given of the overall configuration and operations performed in the sheet separator 50, with reference to FIG. 2.

FIG. 2 is a diagram illustrating the sheet separator 50 included in the image forming apparatus 100 of FIG. 1.

The sheet separator 50 mainly includes the unit sheet feed tray 11 that functions as a first sheet feeder, the sheet separation device 1, the sheet lamination device 51, the ejection tray 13, and a second ejection tray 55.

The sheet separation device 1 separates the non-bonding portion of a two-ply sheet PJ in which two sheets, which are a first sheet P1 and a second sheet P2, are overlapped and bonded together at one end of the two-ply sheet PJ as a bonding portion A of the two-ply sheet PJ (see FIGS. 11A to 11E and other drawings).

In particular, in the present embodiment, the two-ply sheet PJ is made of the first sheet P1 and the second sheet P2 overlapped and bonded together at one side of four sides as the bonding portion A. That is, in the two-ply sheet PJ including the first sheet P1 and the second sheet P2, one side (the bonding portion A) of the first sheet P1 and one side (the bonding portion A) of the second sheet P2 are connected by, e.g., thermal welding, and the other side of the first sheet P1 and the other side of the second sheet P2 are not connected. As the first sheet P1 and the second sheet P2 constructing the two-ply sheet PJ, a transparent film sheet (that is, a laminated sheet) may be employed.

The sheet separation device 1 separates the first sheet P1 and the second sheet P2 constructing the two-ply sheet PJ, in other words, separates the other side of the two sheets that is opposite the bonding portion A that maintains bonding of the first sheet P1 and the second sheet P2. Subsequently, the sheet separation device 1 inserts an inner sheet PM between the separated two sheets, which are the first sheet P1 and the second sheet P2 constructing the two-ply sheet PJ. The inner sheet PM is a sheet including at least one plain sheet or a photograph.

As illustrated in FIG. 2, the sheet separator 50 includes the unit sheet feed tray 11, a sheet feed roller 2, a first conveyance roller pair 4, a second conveyance roller pair 5, a third conveyance roller pair 6, the ejection tray 13, the second ejection tray 55, the sheet lamination device 51, a first sensor 41, a second sensor 42, a third sensor 43, a fourth sensor 44, a fifth sensor 45, a sixth sensor 46, a seventh sensor 47, and an eighth sensor 48, the winding roller 20, the moving mechanism 30, and separation claws 16 each functioning as a separator (see FIGS. 7A to 7C and 11A to 11E).

The sheet separator 50 further includes a plurality of sheet conveyance passages such as a first sheet conveyance passage K1, a second sheet conveyance passage K2, a third sheet conveyance passage K3, a first branched sheet conveyance passage K4, a second branched sheet conveyance passage K5, and a fourth sheet conveyance passage K6. Each of the first sheet conveyance passage K1, the second sheet conveyance passage K2, the third sheet conveyance passage K3, the first branched sheet conveyance passage K4, the second branched sheet conveyance passage K5, and the fourth sheet conveyance passage K6 includes two conveyance guides (guide plates) facing each other to guide and convey the sheet such as the two-ply sheet PJ and the inner sheet PM. The sheet separator 50 further includes a controller 500 that controls sheet conveyance of the sheet (i.e., the two-ply sheet PJ and the inner sheet PM) by performing, e.g., a sheet separating operation, a sheet laminating operation, and a sheet inserting operation. The controller 500 is connected to various drivers driving various parts and units, for example, the above-described parts and units included in the sheet separator 50.

To be more specific, the two-ply sheet PJ is loaded on the unit sheet feed tray 11. The sheet feed roller 2 feeds the uppermost two-ply sheet PJ on the unit sheet feed tray 11, to the first conveyance roller pair 4, and the first conveyance roller pair 4 conveys the two-ply sheet PJ along the first sheet conveyance passage K1.

Each of the unit sheet feed tray 11 and the sheet feed roller 2 functions as a first sheet feeder to feed the two-ply sheet PJ. The first sheet feeder is controlled by the controller 500. To be more specific, the controller 500 drives and rotates the sheet feed roller 2 to feed the two-ply sheet PJ from the unit sheet feed tray 11.

Then, in the image forming apparatus 100 according to the present embodiment, the controller 500 causes the main sheet feed tray 112 and the sheet feed roller 197 (each functioning as a second sheet feeder) to start feeding the inner sheet PM after the unit sheet feed tray 11 and the sheet feed roller 2 (each functioning as a first sheet feeder) feeds the two-ply sheet PJ and before the operation to separate the non-bonding portion of the two-ply sheet PJ is completed.

That is, in the present embodiment, the feeding of the two-ply sheet PJ and the feeding of the inner sheet PM are not performed separately (operated by a user via the operation display panel 49) but are performed in a single operation. To be more specific, as a user presses the button on the operation display panel 49 once to start the operation, the sheet separating operation in which the two-ply sheet PJ is fed and separated and the sheet inserting operation in which the inner sheet PM is inserted into the two-ply sheet PJ between the first sheet P1 and the second sheet P2 separated from each other are collectively performed automatically based on the single instruction.

The operation to start feeding the inner sheet PM from the main sheet feed tray 112 is performed not after completion of the sheet separating operation of the two-ply sheet PJ but performed before completion of the sheet separating operation of the two-ply sheet PJ. Therefore, the time required for a series of steps from when the two-ply sheet PJ is fed from the unit sheet feed tray 11 to when the inner sheet PM is completely inserted in the two-ply sheet PJ is reduced efficiently, and therefore the productivity of the image forming apparatus 100 and the sheet separator 50 is enhanced. That is, the time required for the sheet lamination mode is reduced.

Each of the first conveyance roller pair 4, the second conveyance roller pair 5, the third conveyance roller pair 6, and the ejection roller pair 7 includes a drive roller and a driven roller, and conveys the sheet nipped by the respective nip regions. The third sheet conveyance path K3 includes, from the upstream side, the second conveyance roller pair 5, the winding roller 20, and the third conveyance roller pair 6. In particular, the winding roller 20 and the third conveyance roller pair 6 are configured to be rotatable in a forward direction or in a reverse direction. The third conveyance roller pair 6 conveys the sheet in the forward direction that is the left direction in FIG. 2 and in the reverse direction that is the right direction in FIG. 2. The third conveyance roller pair 6 also functions as a sheet conveying roller pair that conveys the sheet to the sheet lamination device 51 or to the second ejection tray 55. The ejection roller pair 7 functions as a sheet conveying roller pair that conveys and ejects the two-ply sheet PJ (and the inner sheet PM) after the sheet laminating operation, toward the ejection tray 13.

Note that a switching claw 17 is disposed downstream from the third conveyance roller pair 6 in the forward direction (sheet conveyance direction to the left in FIG. 2). The switching claw 17 switches the direction of conveyance of the sheet P, for example, by conveying the sheet P toward the sheet lamination device 51 or toward the second ejection tray 55. The switching claw 17 is controlled according to the mode selected by a user, so as to switch the direction of conveyance (ejection) of the sheet P.

Referring to FIG. 2, each of the first sensor 41, the second sensor 42, the third sensor 43, the fourth sensor 44, and the fifth sensor 45, the seventh sensor 47, and the eighth sensor 48 functions as a sheet detector employing a reflective photosensor that optically detects whether the sheet is present at the position of each sensor. The first sensor 41 is disposed near a portion downstream from the first conveyance roller pair 4 in the sheet conveyance direction. The second sensor 42 is disposed on the second sheet conveyance passage K2 at a portion downstream from the ejection roller pair 131 in the sheet conveyance direction. The third sensor 43 is disposed near a portion downstream from the second conveyance roller pair 5 in the sheet conveyance direction. The fourth sensor 44 is disposed near a portion downstream from the winding roller 20 (at the left side of the winding roller 20 in FIG. 2) and upstream from the third conveyance roller pair 6 (at the right side of the third conveyance roller pair 6 in FIG. 2) in the sheet conveyance direction. The fifth sensor 45 is disposed near a portion downstream from the third conveyance roller pair 6 (at the left side of the third conveyance roller pair 6 in FIG. 2) in the sheet conveyance direction. Further, the seventh sensor 47 is disposed on the first branched sheet conveyance passage K4. The eighth sensor 48 is disposed on the second branched sheet conveyance passage K5.

Note that the sixth sensor 46 functions as an abnormality detector that detects an abnormal state while the sheet separating operation is performed. The detailed description of the sixth sensor 46 is given below.

A description is given of the winding roller 20, with reference to FIGS. 3A, 3B, 4A, 4B, 6B to 6D, and 7A.

Figure 6A:
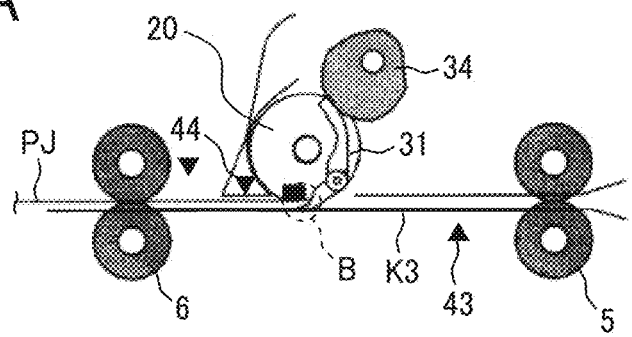
FIGS. 6A to 6D are schematic views, each illustrating the sheet separating operation performed in the sheet separator, subsequent from the sheet separating operation of FIGS. 5A to 5D.
Figure 6B:
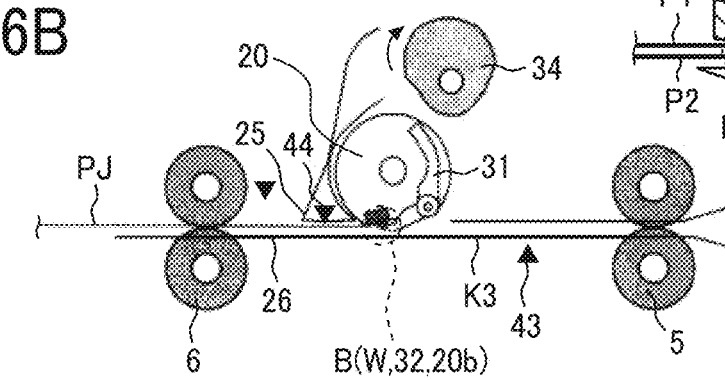
Figure 6B:
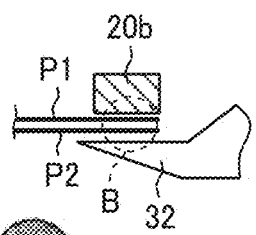

The winding roller 20 is a roller that winds the two-ply sheet PJ, with a gripper 32 that is one example of a gripper (handle) grips a gripped portion B of the two-ply sheet PJ at a winding start position W (see FIG. 6B). The gripped portion B is an end of the two-ply sheet PJ that is opposite an end at which the bonding portion A is formed, which is referred to as the other end of the two-ply sheet PJ. While the gripper 32 grips the gripped portion B of the two-ply sheet PJ, the winding roller 20 rotates in a predetermined rotational direction (that is, the counterclockwise direction in FIG. 6B) to wrap the two-ply sheet PJ around the winding roller 20. The winding roller 20 is rotatable about a rotary shaft 20a in the forward direction and in the reverse direction. The controller 500 controls a drive motor that drives the winding roller 20.

To be more specific, the two-ply sheet PJ starts from the unit sheet feed tray 11 and passes through the first sheet conveyance passage K1, and the second conveyance roller pair 5 conveys the two-ply sheet PJ in the forward direction along the third sheet conveyance passage K3. The two-ply sheet PJ passes through the winding start position W of the winding roller 20 once and is conveyed to a position of the third conveyance roller pair 6 that is a position at which the trailing end of the two-ply sheet PJ passes through the fourth sensor 44 but does not pass through the third conveyance roller pair 6, that is, the position before the third conveyance roller pair 6. Thereafter, the third conveyance roller pair 6 rotates in the reverse direction to convey the two-ply sheet PJ in the reverse direction to the position of the winding roller 20 that is the winding start position W, and the gripper 32 grips the other end (leading end) of the two-ply sheet PJ. The two-ply sheet PJ is further conveyed in a state in which the other end (leading end) of the two-ply sheet PJ is gripped by the gripper 32, and the winding roller 20 rotates in the counterclockwise direction in FIG. 2 to wind the two-ply sheet PJ around the winding roller 20.

Figure 6C:
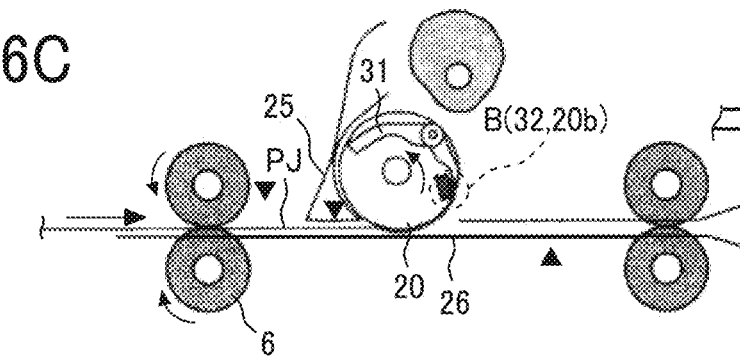
Figure 6C:
Figure 6D:
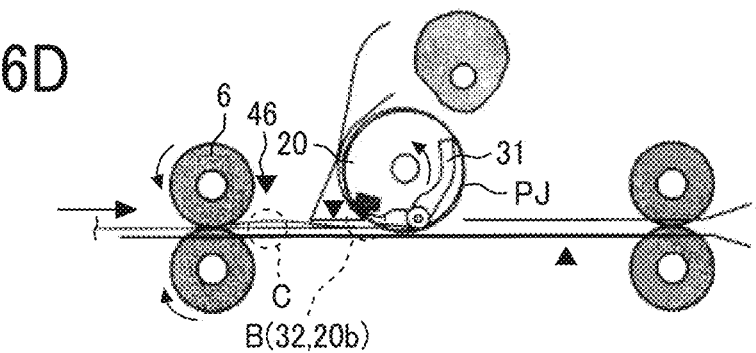
Figure 7A:
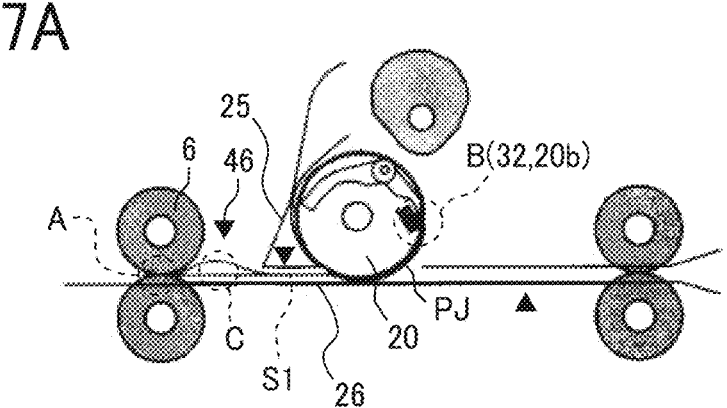
FIGS. 7A to 7C are schematic views, each illustrating the sheet separating operation performed in the sheet separator, subsequent from the sheet separating operation of FIGS. 6A to 6C.

With reference to FIG. 6C', when the two-ply sheet PJ is wound around the winding roller 20, the length of a sheet wound around the winding roller 20 is proportional to the diameter of the winding roller 20. Therefore, since a first sheet P1 is on the inner side to the center of the winding roller 20, that is, closer to the inner circumferential surface of the winding roller 20, than a second sheet P2 on the outer side to the center of the winding roller 20, that is, closer to the outer circumferential surface of the winding roller 20, the length of the first sheet P1 wound around the winding roller 20 is shorter than the length of the second sheet P2 wound around the winding roller 20. As a result, misalignment occurs in a part of the two-ply sheet PJ in which the sheet P1 is in close contact with the sheet P2 (in other words, the part in which the sheet P1 sticks to the sheet P2) other than the bonding portion A and the gripped portion B. The misalignment causes the first sheet P1 to slack and bend toward the second sheet P2, forming a gap C between the two sheets, which are the first sheet P1 and the second sheet P2, in the vicinity of the bonding portion A of the two-ply sheet PJ, as illustrated in FIGS. 6D and 7A. In other words, when the first sheet P1 that is placed on the second sheet P2 is warped upward, the gap C is formed between the first sheet P1 and the second sheet P2 at one end of the two-ply sheet PJ, that is, the upstream side in the sheet conveyance direction when the two-ply sheet PJ is conveyed in the right direction in FIG. 1. As described above, the first sheet P1 and the second sheet P2 that are in close contact with each other without any gap are separated from each other.

Particularly in the present embodiment, in order to significantly form the gap C as described above, that is, in order to increase the difference between the length of the first sheet P1 wound around the winding roller 20 and the length of the second sheet P2 wound around the winding roller 20, the two-ply sheet PJ is wound around the winding roller 20 at least one round.

As described above, in the present embodiment, by providing the winding roller 20 to wind the two-ply sheet PJ around the rotary shaft 20a, the two-ply sheet PJ is separatable without increasing the size and cost of the sheet separator 50.

As illustrated in FIG. 6B', the gripper 32 in the present embodiment is configured to grip the gripped portion B of the two-ply sheet PJ without contacting the end surface of the other end of the gripped portion B of the two-ply sheet PJ.

To be more specific, the gripper 32 is configured to nip and grip the gripped portion B of the two-ply sheet PJ between the gripper 32 and a receiving portion 20b of the winding roller 20 without causing any member to contact the end surface of the other end of the two-ply sheet P3, in other words, without causing any member to hit or contact the end surface of the two-ply sheet PJ. The receiving portion 20b of the winding roller 20 is a part of the outer circumferential portion of the winding roller 20 and is arranged to be exposed outwardly and facing the gripper 32.

To be more specific, the two-ply sheet PJ is not nipped and gripped by the gripper 32 and the receiving portion 20b of the winding roller 20 in a state in which a specific member such as the gripper 32 contacts the end surface of the other end (that is the leading end face). The two-ply sheet PJ is nipped and gripped by the gripper 32 and the receiving portion 20b while the end surface of the other end (leading end face) does not contact any member. In this state, the gripper is located close to the second sheet P2 on the outer side to the center of the winding roller 20 and the receiving portion 20b is located close to the first sheet P1 on the inner side to the center of the winding roller 20.

Therefore, when compared with a configuration in which the leading end face of the two-ply sheet PJ contacts a member, the above-described structure according to the present embodiment reduces damage on the two-ply sheet PJ (particularly, the leading end). In particular, once the leading end face of the two-ply sheet PJ is damaged, it is difficult to perform the sheet laminating operation on the damaged leading end face. Therefore, the configuration of the present disclosure is useful.

Note that, in the present embodiment, the bonding portion A of the two-ply sheet PJ wound around the winding roller 20 is the one end of the two-ply sheet PJ. The one end is opposite to the other end functioning as the gripped portion B.

In the present embodiment, at least one of the gripper 32 (handle) and the receiving portion 20b is made of elastic material such as rubber.

According to this configuration, when compared with a sheet separation device having a configuration in which the gripper 32 and the receiving portion 20b have rigid bodies made of metal or resin, the above-described sheet separation device 1 according to the present embodiment enhances the gripping force to grip the two-ply sheet PJ and prevents the surfaces of the two-ply sheet PJ from being damaged. In particular, the sheet separation device 1 including the gripper 32 and the receiving portion 20b made of the elastic material easily exhibits the above-described effect.

As illustrated in FIGS. 3A to 4B, the moving mechanism 30 moves the gripper 32 between a gripping position (e.g., the position illustrated in FIGS. 3A and 4A) at which the gripper 32 grips the two-ply sheet PJ and a releasing position (e.g., the position illustrated in FIGS. 3B and 4B) at which the gripper 32 is released from the gripping position.

To be more specific, the moving mechanism 30 includes an arm 31, a compression spring 33, a cam 34, and a motor. The compression spring 33 functions as a biasing member. The motor drives to rotate the cam 34 in the forward direction or the reverse direction.

The arm 31 holds the gripper 32. The arm 31 and the gripper 32 are held together by the winding roller 20 to be rotatable together about a support shaft 31a. In the present embodiment, the gripper 32 is connected to the tip of the arm 31, and the gripper 32 and the arm 31 are made (held) as a single unit. Alternatively, the gripper 32 and the arm 31 may be made as separate members, and the gripper 32 may be mounted on the arm 31, that is, may be held by the arm 31. In any case, the arm 31 holding the gripper 32 rotates about the rotary shaft 20a together with the winding roller 20.

Figure 3A:
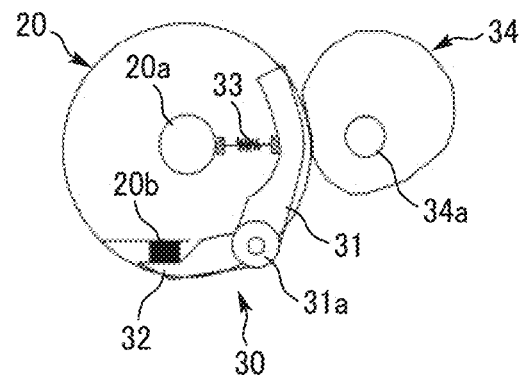
FIG. 3A is a side view illustrating a gripper that has moved to a gripping position in the sheet separator illustrated in FIG. 1.
Figure 3B:
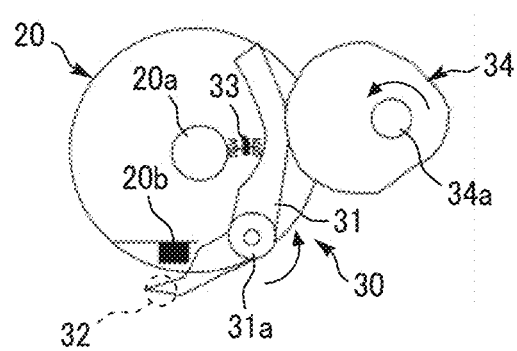
FIG. 3B is a side view illustrating the gripper that has moved to a releasing position in the sheet separator illustrated in FIG. 1.

The compression spring 33 functions as a biasing member that biases the arm 31 so that the gripper 32 moves from the releasing position illustrated in FIG. 3B to the gripping position illustrated in FIG. 3A. To be more specific, one end of the compression spring 33 is connected to a fixed position near the rotary shaft 20a, and the other end of the compression spring 33 is connected to one end of the arm 31 that is an end opposite to the other end of the arm 31 connected to the gripper 32 with respect to the support shaft 31a.

The cam 34 pushes the arm 31 against the biasing force of the compression spring 33 that functions as the biasing member, so that the gripper 32 moves from the gripping position illustrated in FIG. 3A to the releasing position illustrated in FIG. 3B. The motor controlled by the controller 500 drives the cam 34 to rotate in the forward direction or the reverse direction at a desired rotation angle. The cam 34 is held by the apparatus housing so as to be rotatable about a cam shaft 34*a* separately from the winding roller 20.

In the moving mechanism 30 configured as described above, as illustrated in FIGS. 3A and 4A, in a state in which the cam 34 is not in contact with the arm 31, the arm 31 is biased by the compression spring 33 to press the gripper 32 against the receiving portion 20*b*. This state is referred to as a closed state. In the closed state, the gripper 32 and the receiving portion 20*b* grip the two-ply sheet PJ.

Figure 4A:
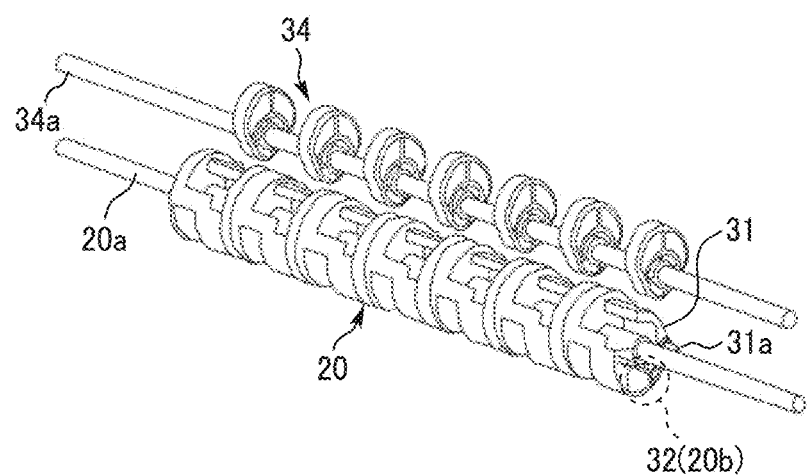
FIG. 4A is a perspective view illustrating the gripper that has moved to the gripping position in the sheet separator illustrated in FIG. 1
Figure 4B:
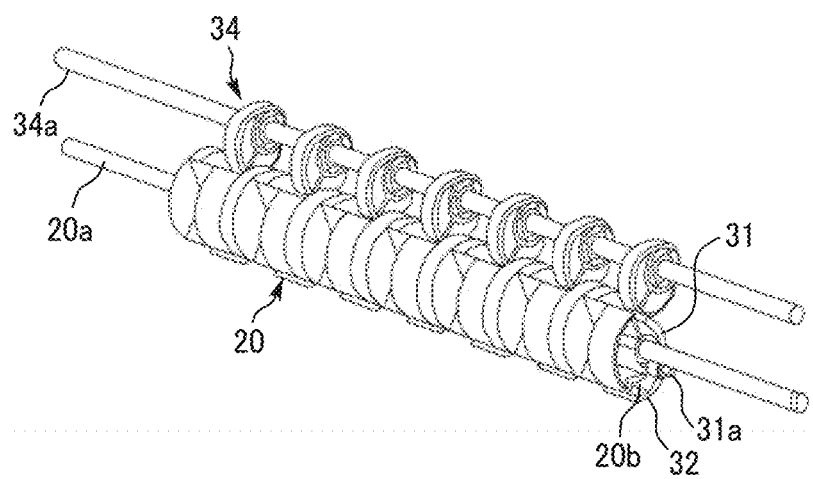
FIG. 4B is a perspective view illustrating the gripper that has moved to the releasing position in the sheet separator illustrated in FIG. 1.

By contrast, as illustrated in FIGS. 3B and 4B, in a state in which the cam 34 is contacts and presses the arm 31, the arm 31 rotates in the counterclockwise direction in FIG. 3B about the support shaft 31*a* against the biasing force of the compression spring 33, so that the gripper 32 separates from the receiving portion 20*b*. This state is referred to as an open state. In the open state, the two-ply sheet PJ is not gripped, which is referred to as a grip release state.

Note that, in the present embodiment, as illustrated in FIGS. 4A and 4B, the winding roller 20 includes a plurality of roller portions (i.e., seven roller portions in the present embodiment) separated in the axial direction of the winding roller 20. Similarly, the cam 34 includes a plurality of cam portions separated in the axial direction of the cam 34 so that the divided positions of the plurality of cam portions of the cam 34 respectively meet and face the plurality of roller portions of the winding roller 20.

Setting portions separated in the axial direction to grip the two-ply sheet PJ as described above, that is, not setting the entire area of the winding roller 20 and the cam 34 in the axial direction to grip the two-ply sheet PJ share load to grip the two-ply sheet PJ. The above-described configuration is useful when a gripping force required to grip the two-play sheet PJ increases.

Figure 5A:
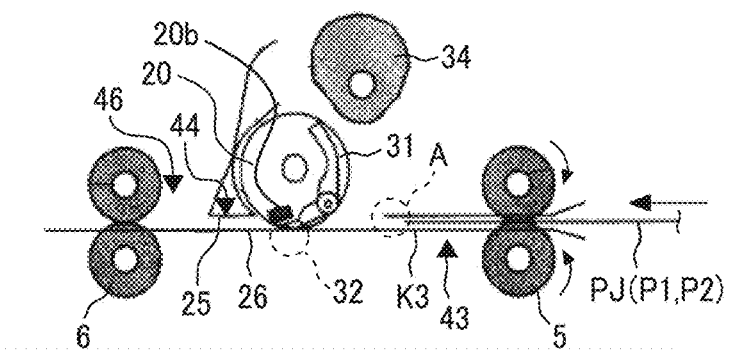
FIGS. 5A to 5D are schematic views, each illustrating a sheet separating operation performed in the sheet separator illustrated in FIG. 1.
Figure 5B:
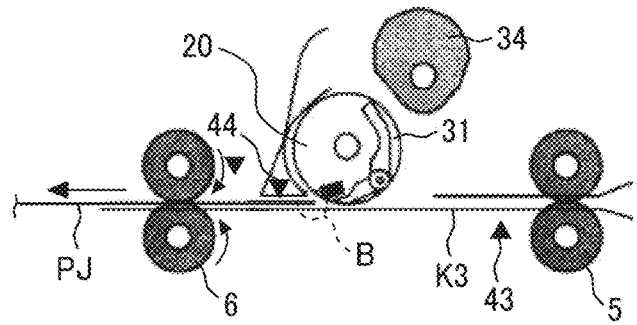
Figure 5C:
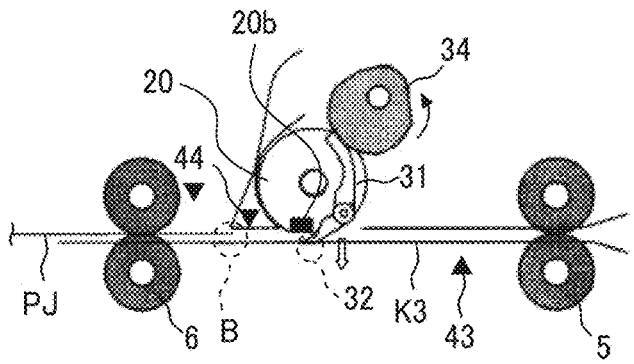
Figure 5D:
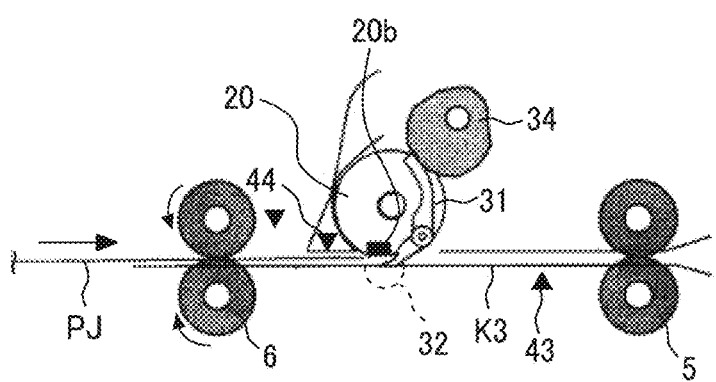

Here, a description is given of the fourth sensor 44 in the sheet separator 50 according to the present embodiment, with reference to FIGS. 2, 5D, and 6A.

The fourth sensor 44 functions as a sheet detector to detect the two-ply sheet PJ conveyed between the winding roller 20 and the third conveyance roller pair 6. The fourth sensor 44 detects the leading end of the two-ply sheet PJ conveyed to the winding roller 20 in the sheet conveyance direction by the third conveyance roller pair 6. Based on the detection results detected by the fourth sensor 44, the controller 500 controls the moving mechanism 30.

To be more specific, the fourth sensor 44 is disposed in the sheet conveyance passage between the winding roller 20 and the third conveyance roller pair 6. As illustrated in FIGS. 5D and 6A, when the third conveyance roller pair 6 conveys the two-ply sheet PJ in the reverse direction toward the position of the winding roller 20 in the reverse direction, with the gripped portion B of the two-ply sheet PJ being the leading end, the fourth sensor 44 detects the leading end (that is, the tip of one end of the gripped portion B) of the two-ply sheet PJ when the two-ply sheet PJ is conveyed in the reverse direction. In response to the detection timing at which the fourth sensor 44 detects the leading end (that is, the one end of the gripped portion B) of the two-ply sheet PJ in the reverse direction, the controller 500 adjusts and controls a timing to stop the two-ply sheet PJ at the gripping position and a timing at which the gripper 32 grips the gripped portion B. To be more specific, after a predetermined time has passed since the fourth sensor 44 detected the leading end of the two-ply sheet PJ, the third conveyance roller pair 6 stops conveyance of the two-ply sheet PJ in the reverse direction, and the cam 34 rotates to pivot the arm 31 of the moving mechanism 30 so that the gripper 32 moves from the releasing position illustrated in FIG. 3B to the gripping position illustrated in FIG. 3A.

The above-described control accurately performs an operation in which the end surface of the two-ply sheet PJ is nipped by the gripper 32 and the receiving portion 20*b* without contacting (abutting) the end surface of the two-ply sheet PJ on any member.

As described above, the third conveyance roller pair 6 is a sheet conveying roller pair that conveys the two-ply sheet PJ with the other end (the opposite end opposite the one end of the two-ply sheet PJ, i.e., the gripped portion B) as a leading end, toward the winding start position W of the winding roller 20 in the third sheet conveyance passage K3 (sheet conveyance passage) between the third conveyance roller pair 6 and the winding roller 20.

Now, a description is given of the separation claws 16 each functioning as a separator, with reference to FIGS. 7A to 7C, 10, 11A to 11E, and 15.

Figure 15:
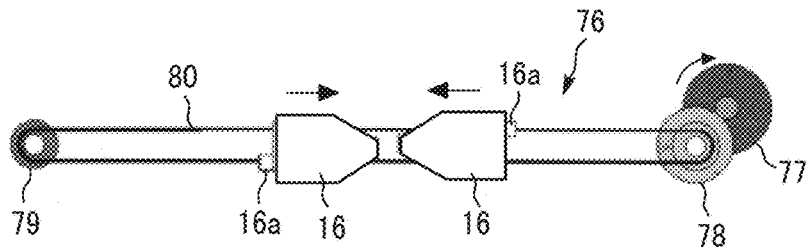
FIG. 15 is a schematic view illustrating the configuration of a moving mechanism to move the separation claws.

Each of the separation claws 16 is a claw-shaped member that moves from the standby position illustrated in FIG. 15 to be inserted into the gap C formed in the non-bonding portion (the gripped portion) between the first sheet P1 and the second sheet P2 of the two-ply sheet PJ at a predetermined position of the two-ply sheet PJ.

To be more specific, the separation claws 16 are inserted into the gap C formed between the first sheet P1 and the second sheet P2 at a position between the winding roller 20 and the third conveyance roller pair 6 from the standby positions outside both ends of the two-ply sheet PJ in the width direction of the two-ply sheet PJ, with respect to the two-ply sheet PJ in a state in which the other end (that is the gripped portion B) is wound by the winding roller 20 and the one end (that is the bonding portion A) is nipped by the third conveyance roller pair 6.

Figure 7B:
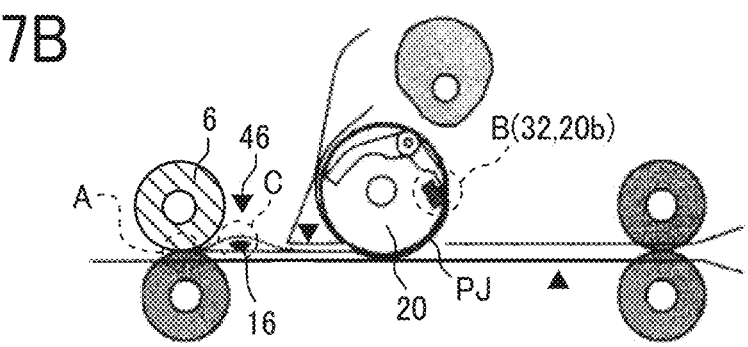
Figure 7C:
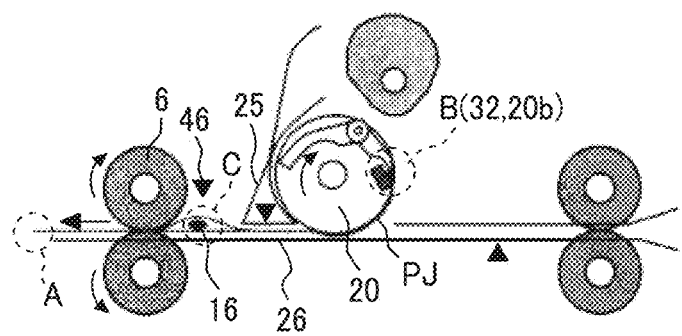
Figure 10:
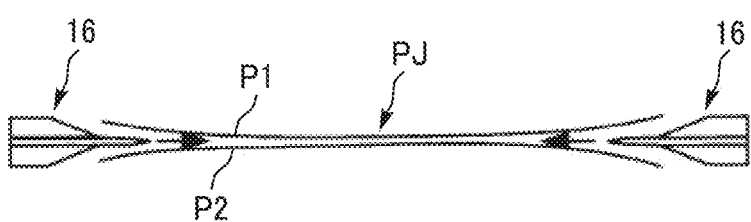
FIG. 10 is a schematic view illustrating separation claws, each being inserted in a two-ply sheet in a width direction of the two-ply sheet.

More specifically, in the present embodiment, the separation claws 16 are a pair of separation claws that functions as a pair of separators disposed at both sides of the two-ply sheet PJ in the width direction that is the direction perpendicular to a plane on which FIGS. 7A to 7C are illustrated and the horizontal direction in FIGS. 10 and 15. As illustrated in FIGS. 11A to 11E, the vertical length of each of the separation claws 16 in the vertical direction (thickness direction) of the two-ply sheet PJ gradually increases from the tip of each of the separation claws 16 near the center in the width direction of the two-ply sheet PJ, to the rear end of the separation claw 16 near the outsides in the width direction of the two-ply sheet PJ. Further, the separation claws 16 are movable in the width direction of the two-ply sheet PJ by a driving device 76 (see FIG. 15) controlled by the controller 500.

Figure 11A:
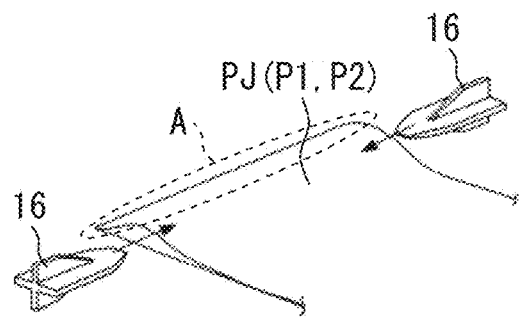
FIGS. 11A to 11E are perspective views, each illustrating the operation of the separation claws.
Figure 11B:
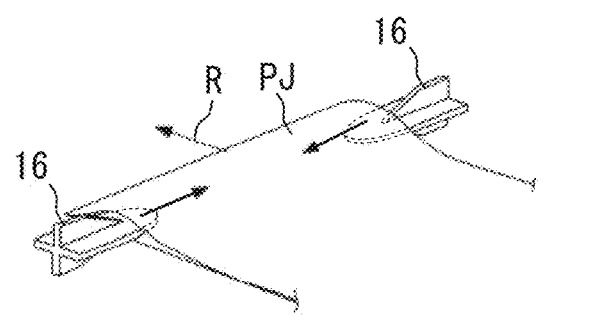

The separation claws 16 configured as described above ordinarily stand by at respective standby positions at which the separation claws 16 do not interfere with conveyance of the sheet such as the two-ply sheet PJ in the third sheet conveyance passage K3. As illustrated in FIG. 11A, the standby positions of the separation claws 16 are outside of the two-ply sheet PJ (including the first sheet P1 and the second sheet P2) in the width direction of the two-ply sheet PJ. Subsequently, as illustrated in FIGS. 10 and 11B, the separation claws 16 enter the gap C in the two-ply sheet PJ when separating the two-ply sheet PJ (including the first sheet P1 and the second sheet P2). As a result, the separation claws 16 secure the gap C to be relatively large.

As illustrated in FIG. 15, the driving device 76 that moves the pair of separation claws 16 in the width direction includes a motor 77, a gear pulley 78, a pulley 79, and a timing belt 80. The gear pulley 78 has a step-like ring shape including a gear and a pulley. The gear meshes with a motor gear mounted on a motor shaft of the motor 77. The pulley stretches and supports the timing belt 80 together with the pulley 79. One separation claw 16 of the pair of separation claws 16 includes a fixed portion 16a that is fixed to a part of the belt surface of the timing belt 80 that is the upper side of the belt surface in FIG. 15. The other separation claw 16 includes a fixed portion 16a that is fixed to a part of the other belt surface of the timing belt 80 that is the lower side of the belt surface in FIG. 15.

In the driving device 76 as configured described above, the motor 77 drives to rotate the motor shaft in a direction indicated by arrow in FIG. 15 (i.e. clockwise direction), the gear pulley 78 rotates counterclockwise, the timing belt 80 rotates in the counterclockwise direction, and the pair of separation claws 16 moves from the outside in the width direction of the two-ply sheet PJ to the center in the width direction of the two-ply sheet PJ (that is, the pair of separation claws 16 approaches each other). In contrast, when the motor 77 drives to rotate the motor shaft in the direction opposite to the arrow direction in FIG. 15, the pair of separation claws 16 moves from the center in the width direction of the two-ply sheet PJ toward the outside in the width direction of the two-ply sheet PJ (that is, the pair of the separation claws 16 moves in a direction away from each other).

In a state in which the separation claws 16 are inserted into the gap C in the two-ply sheet PJ, the separation claws 16 relatively move from the one end of the two-ply sheet PJ near the bonding portion A to the other end of the two-ply sheet PJ near the gripped portion B. Then, the separation claws 16 move in the width direction between the first sheet P1 and the second sheet P2 at the other end of the two-ply sheet PJ.

Figure 11C:
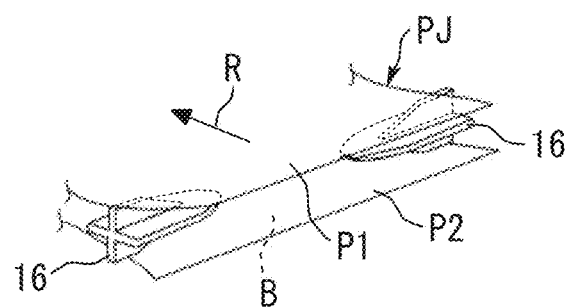
Figure 11D:
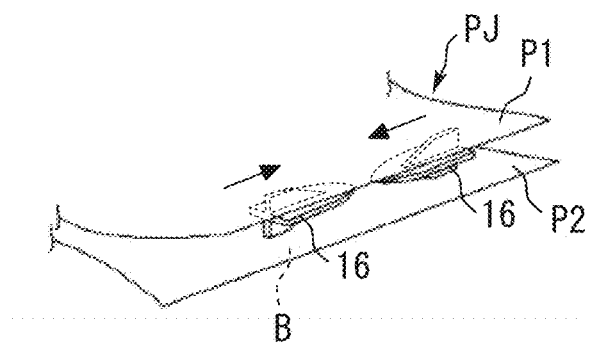

Specifically, the controller 500 controls the driving device 76 (see FIG. 15) to move the pair of separation claws 16 as follows. As illustrated in FIGS. 11B and 11C, the pair of separation claws 16 is inserted into both ends of the gap C in the two-ply sheet PJ in the width direction and relatively moves to the other end of the two-ply sheet PJ that is the gripped portion B. After the pair of separation claws 16 has relatively moved to the other end of the two-ply sheet PJ, as illustrated in FIG. 11D, the pair of separation claws 16 on the other end of the two-ply sheet PJ moves in the width direction from both ends of the two-ply sheet PJ to the center of the two-ply sheet PJ between the first sheet P1 and the second sheet P2. In order to cause the pair of separation claws 16 to move as described above, the driving device 76 is configured so that the pair of separation claws 16 moves from the standby positions to the positions at which the separation claws 16 come close to each other.

The above-described mechanism, which includes the winding roller 20 to wind the two-ply sheet PJ and the separation claws 16 to be inserted into the two-ply sheet PJ so as to separate the two-ply sheet PJ, reduces the size of the sheet separation device 1, when compared with a mechanism using a large-scale device such as a vacuum device to separate the two-ply sheet PJ. That is, without increasing the size of the sheet separator 50, the above-described mechanism reliably separates the first sheet P1 and the second sheet P2 constructing the two-ply sheet PJ.

In particular, since the separation claws 16 in the present embodiment move over substantially the entire area in the width direction of the two-ply sheet PJ on the other end of the two-ply sheet PJ (that is the trailing end of the two-ply sheet PJ), the separation claws 16 sufficiently separate (in other words, peel) the other ends of the first sheet P1 and the second sheet P2 constructing the two-ply sheet PJ that is opposite the bonding portion A. Therefore, it is less likely that the above-described configuration causes an inconvenience that the other end of the two-ply sheet PJ that is opposite the bonding portion A is not sufficiently separated and that the inner sheet PM (see FIG. 11E) would not be inserted into the other end of the two-ply sheet PJ from the other end of the two-ply sheet PJ. Additionally, the above-described configuration allows the separation claws 16 to easily function as a switcher, that is, to separately guide the first sheet P1 and the second sheet P2 to the first branched sheet conveyance passage K4 and the second branched sheet conveyance passage K5, respectively.

Here, a description is given of the separation claws 16 that functions as a switcher, with reference to FIGS. 7A to 10E.

In the present embodiment, the separation claws 16 that functions as a separator also function as a switcher that guides the first sheet P1 and the second sheet P2 separated by the separation claws 16, to the first branched sheet conveyance passage K4 and the second branched sheet conveyance passage K5 branching off in different directions, respectively (see FIG. 7C).

Figure 8A:
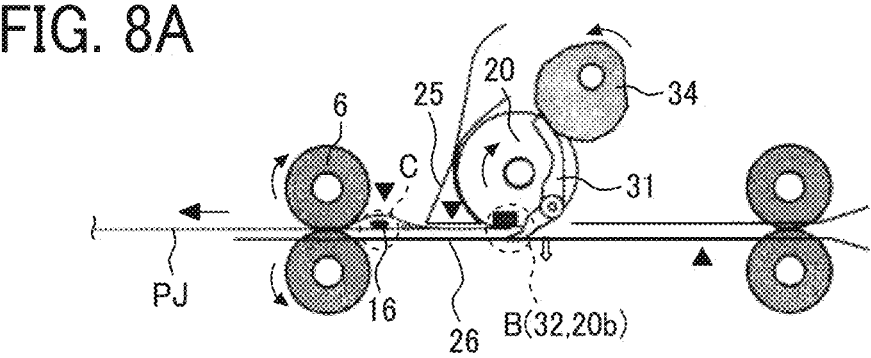
FIGS. 8A to 8C are schematic views, each illustrating the sheet separating operation performed in the sheet separator, subsequent from the sheet separating operation of FIGS. 7A to 7C.
Figure 8B:
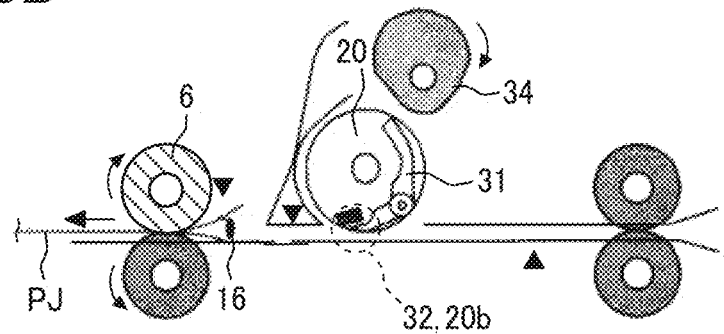
Figure 8C:
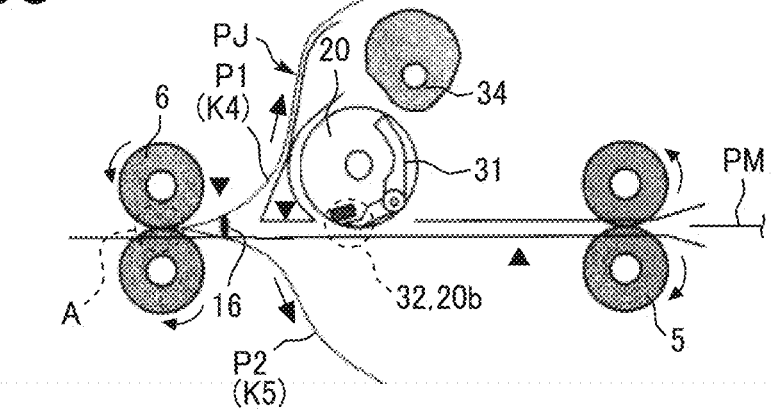

To be more specific, as illustrated in FIG. 8C, the first branched sheet conveyance passage K4 and the second branched sheet conveyance passage K5 branch off in different directions from the third sheet conveyance passage K3 between the winding roller 20 and each of the separation claws 16 (separator). To be more specific, the first branched sheet conveyance passage K4 branches upward from the third sheet conveyance passage K3, and the second branched sheet conveyance passage K5 branches downward from the third sheet conveyance passage K3.

As illustrated in FIGS. 8A to 8C, after the separation claws 16 are inserted into the gap C, the third conveyance roller pair 6 conveys the one end of the two-ply sheet PJ to the left side in FIGS. 8A to 8C so that the winding of the other end of the two-ply sheet PJ on the winding roller 20 is released (see FIG. 11A to FIG. 11C). In other words, the controller 500 causes the third conveyance roller pair 6 to convey the two-ply sheet PJ toward the one end of the two-ply sheet PJ (I.e., the left side in FIGS. 8A to 8C). After the winding of the other end of the two-ply sheet PJ on the winding roller 20 is released, the separation claws 16 move to the center in the width direction of the two-ply sheet PJ as illustrated in FIG. 11D, and stop at the center in the width direction of the two-ply sheet PJ. Then, while the separation claws 16 remain in the above-described state, the third conveyance roller pair 6 conveys the other end of the two-ply sheet PJ to the right side in FIGS. 8A to 8C again. In other words, the controller 500 causes the third conveyance roller pair 6 to convey the two-ply sheet PJ toward the other end of the two-ply sheet PJ. Thereafter, the separation claws 16 guide the first sheet P1 and the second sheet P2 separated by the separation claws 16, to the first branched sheet conveyance passage K4 and the second branched sheet conveyance passage K5, respectively. That is, the controller 500 causes the separation claws 16 to guide the two sheets (i.e., the first sheet P1 and the second sheet P2) separated by the separation claws 16, to the two branched sheet conveyance passages (i.e., the first branched sheet conveyance passage K4 and the second branched sheet conveyance passage K5) separately. Consequently, the first sheet P1 is guided to the first branched sheet conveyance passage K4, and the second sheet P2 is guided to the second branched sheet conveyance passage K5. Subsequently, as illustrated in FIGS. 9A to 9C and 11E, the separation claws 16 move to the standby positions, and the second conveyance roller pair 5 conveys the inner sheet PM to the one end of the third sheet conveyance passage K3, that is, the right side in FIGS. 9A to 9C, to insert the inner sheet PM between the first sheet P1 and the second sheet P2 separated from the two-ply sheet PJ. In other words, the controller 500 causes the separation claws 16 to move to the standby positions and the second conveyance roller pair 5 to convey the inner sheet PM fed by the sheet feed roller 197 (the second sheet feeder), toward the one end of the third sheet conveyance passage K3, to insert the inner sheet PM between the two sheets (the first sheet P1 and the second sheet P2) of the two-ply sheet PJ separated from each other.

As described above, each of the separation claws 16 in the present embodiment functions as a separator that separates (in other words, peels) the non-bonding portion of the first sheet P1 and the second sheet P2 constructing the two-ply sheet PJ, and also functions as a switcher that separately guides the separated two sheets, which are the first sheet P1 and the second sheet P2, to the first branched sheet conveyance passage K4 and the second branched sheet conveyance passage K5, respectively. Accordingly, the above-described configuration reduces the size and cost of the sheet separator 50, when compared with the configuration of a sheet separation device including the separator and the switcher as different units. That is, the above-described configuration efficiently and reliably separates the first sheet P1 and the second sheet P2 of the two-ply sheet PJ.

The seventh sensor 47 optically detects a state in which the first sheet P1 separated apart from the second sheet P2 is successfully conveyed to the first branched sheet conveyance passage K4. Further, the eighth sensor 48 optically detects a state in which the second sheet P2 separated apart from the first sheet P1 is successfully conveyed to the second branched sheet conveyance passage K5.

Note that each separation claw 16 in the present embodiment functions as both a separator and a switcher. However, the sheet separation device 1 according to the present embodiment may further include a member that functions as a switcher, different from the separation claw 16 that functions as a separator.

Here, a description is given of a first guide 25 provided in the sheet separator 50 according to the present embodiment, with reference to FIGS. 7A and 7C.

The first guide 25 is disposed between the separation claws 16 and the winding roller 20 in the third sheet conveyance passage K3. The first guide 25 functions as a limiter to limit an amount of slack (in other words, a deflection amount) of the first sheet P1 that is wound around the winding roller 20 on the inner side of the first sheet P1 and the second sheet P2 of the two-ply sheet PJ wound around the winding roller 20.

To be more specific, the first guide 25 that functions as a limiter is a conveyance guide disposed on the side in which the winding roller 20 is disposed with respect to an imaginary plane S1, that is, above the imaginary plane S1 in FIG. 7A, in the third sheet conveyance passage K3. The imaginary plane S1 is an imaginary plane passing through the winding start position W of the winding roller 20 and the nip region of the third conveyance roller pair 6 in the third sheet conveyance passage K3 (see FIG. 7A). The first guide 25 has a shape like substantially a triangular prism having a plane along the outer circumferential surface of the winding roller 20, and the plane covers a part of the outer circumferential surface of the winding roller 20 and is separated from the winding roller 20 by a predetermined gap. The first guide 25 functions as a conveyance guide of the third sheet conveyance passage K3 and a conveyance guide of the first branched sheet conveyance passage K4. That is, the first guide 25 guides the sheet conveyed through the third sheet conveyance passage K3, the sheet conveyed through the first branched sheet conveyance passage K4, and the sheet wound around the winding roller 20.

In particular, in the third sheet conveyance passage K3, the first guide 25 limits bending the two-ply sheet PJ upward (in particular, bending the first sheet P1 upward) between the winding roller 20 and the third conveyance roller pair 6. Therefore, the gap C in the two-ply sheet PJ that is mainly formed by bending the first sheet P1 upward is intensively formed between the first guide 25 and the third conveyance roller pair 6. Accordingly, the above-described configuration increases the size of the gap C even if the winding amount of the two-ply sheet PJ wound around the winding roller 20 is not large, and the separation claws 16 smoothly enter the gap C to separate the two-ply sheet PJ.

Now, a description is given of a second guide 26 provided in the sheet separator 50 according to the present embodiment, with reference to FIGS. 7A and 7C.

The second guide 26 is disposed between the separation claws 16 and the winding roller 20 in the third sheet conveyance passage K3. The second guide 26 functions as a guide to guide the second sheet P2 that is an outer sheet of the two sheets P1 and P2 of the two-ply sheet PJ wound around the winding roller 20.

To be more specific, the second guide 26 that functions as a guide is a sheet conveyance guide disposed on the side in which the winding roller 20 is not disposed with respect to the imaginary plane S1, that is, below the imaginary plane S1 in FIG. 7A, in the third sheet conveyance passage K3. The second guide 26 is disposed to face the lower surface of the sheet from a portion close and upstream from the second conveyance roller pair 5 in the forward direction to a portion downstream from the third conveyance roller pair 6 in the forward direction. That is, the second guide 26 guides the sheet conveyed on the third sheet conveyance passage K3.

In particular, in the third sheet conveyance passage K3 between the winding roller 20 and the third conveyance roller pair 6, a clearance between the first guide 25 and the second guide 26 is set to be a value by which the sheet having the largest thickness is conveyed. Since this setting limits a gap between the first sheet P1 and the second sheet P2 constructing the two-ply sheet PJ so as not to be too large between the first guide 25 and the second guide 26, the gap C in the two-ply sheet PJ that is mainly formed by bending the first sheet P1 upward is intensively formed. Accordingly, the separation claws 16 smoothly enter the gap C to separate the two-ply sheet PJ.

Here, a description is given of the sixth sensor 46, with reference to FIGS. 7A to 7C.

The sixth sensor 46 functions as an abnormality detection sensor or an abnormality detector to detect an abnormal state in which the gap C formed between the first sheet P1 and the second sheet P2 at a predetermined position (that is, a position between the third conveyance roller pair 6 and the winding roller 20) is not larger than a predetermined size before the separation claws 16 move from the standby positions, to be more specific, before the separation claws 16 move from the standby positions illustrated in FIG. 15 to the separation positions illustrated in FIGS. 10 and 11A. The predetermined size is the size of the gap C into which the separation claws 16 enter, which is determined by experiments. That is, the sixth sensor 46 that functions as the abnormality detector detects the abnormal state in which the gap C formed between the first sheet P1 and the second sheet P2 at a predetermined position is not larger than the predetermined size before the separation claws 16 are inserted into the gap C.

In other words, at a timing at which the gap C is formed between the first sheet P1 and the second sheet P2, as illustrated in FIGS. 6D and 7A, the sixth sensor 46 that functions as an abnormality detector detects the abnormal state such as a state in which the gap is not formed at all or a state in which the gap is not formed as a sufficient gap C.

In the present embodiment, the controller 500 notifies occurrence of an abnormal state when the abnormal state is detected by the sixth sensor 46 (abnormality detector). Specifically, as illustrated in FIG. 1, the image forming apparatus 100 includes the operation display panel 49 that functions as an operation display device on the exterior of the image forming apparatus 100 to display various kinds of information about the image forming apparatus 100 and input various kinds of commands. When the controller 500 determines the abnormal state based on the results detected by the sixth sensor 46, that is, when the two-ply sheet PJ does not have the sufficiently large gap C, the controller 500 controls the operation display panel 49 to display that the abnormal state is detected. For example, the operation display panel 49 displays "Since an abnormality has occurred, the process of inserting the inner sheet is stopped. Please check the setting direction of the two-ply sheet in the unit sheet feed tray 11. If the setting direction is correct and similar abnormalities are repeated, please contact a service person."

The above-described sixth sensor 46 that functions as the abnormality detector may be, for example, a lever type sensor that comes into contact with the upper first sheet P1 of the two-ply sheet PJ forming the gap C larger than the predetermined size.

Now, a description is given of the operations performed in the sheet separator 50 to separate the two-ply sheet PJ, with reference to FIGS. 5A to 9C.

Further, in the description of the operations, the operations of the separation claws 16 are appropriately described with reference to FIGS. 10 to 11E, and the control flow is described with reference to a flowchart of FIGS. 13 and 14 including FIGS. 14A and 14B.

Figure 13:
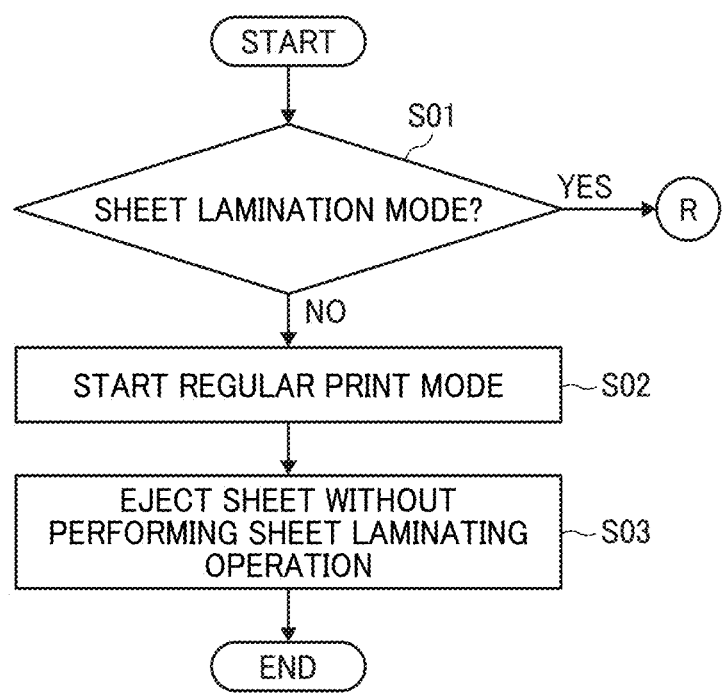
FIG. 13 is a flowchart illustrating a flow of a control process executed in the image forming apparatus.

First, when the print operation command is issued, the controller 500 determines whether the print mode is the "sheet lamination mode" (step S01 of FIG. 13). As a result, when the print mode is not the sheet lamination mode (NO in step S01 of FIG. 13), it is determined that the regular print mode is selected. Accordingly, the controller 500 starts the regular print mode (step S02 of FIG. 13). Then, the print operation is performed on the sheet P that is fed from the main sheet feed tray 112. After completion of the print operation, the sheet P with the image is ejected to the second ejection tray 55 without performing the sheet laminating operation on the sheet P (step S03 of FIG. 13). Thus, the flow of the print operation is completed.

Figure 14A:
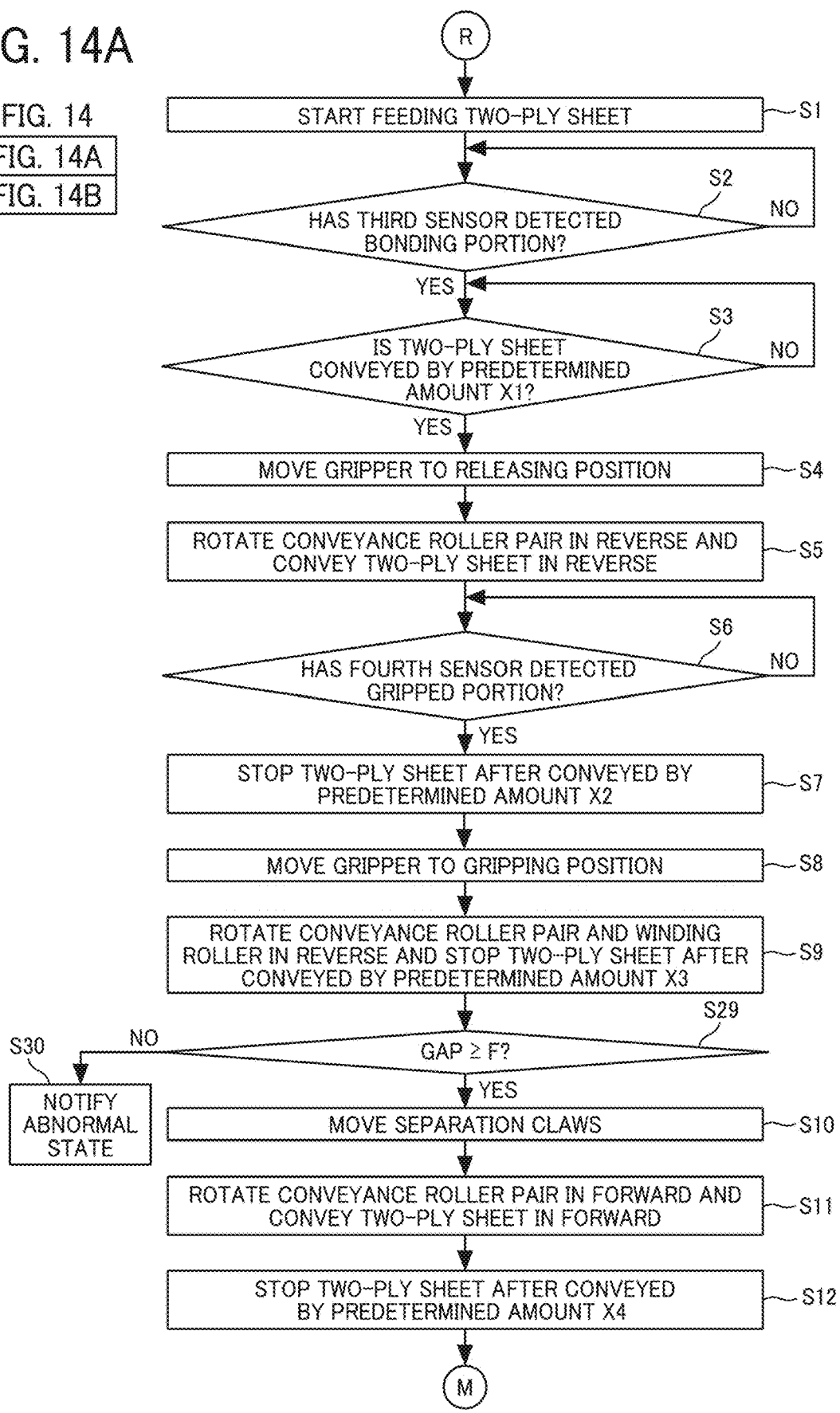
FIGS. 14A and 14B is a flowchart illustrating a flow of a subsequent control process subsequent from the flowchart of FIG. 13, executed in a sheet lamination mode.
Figure 14B:
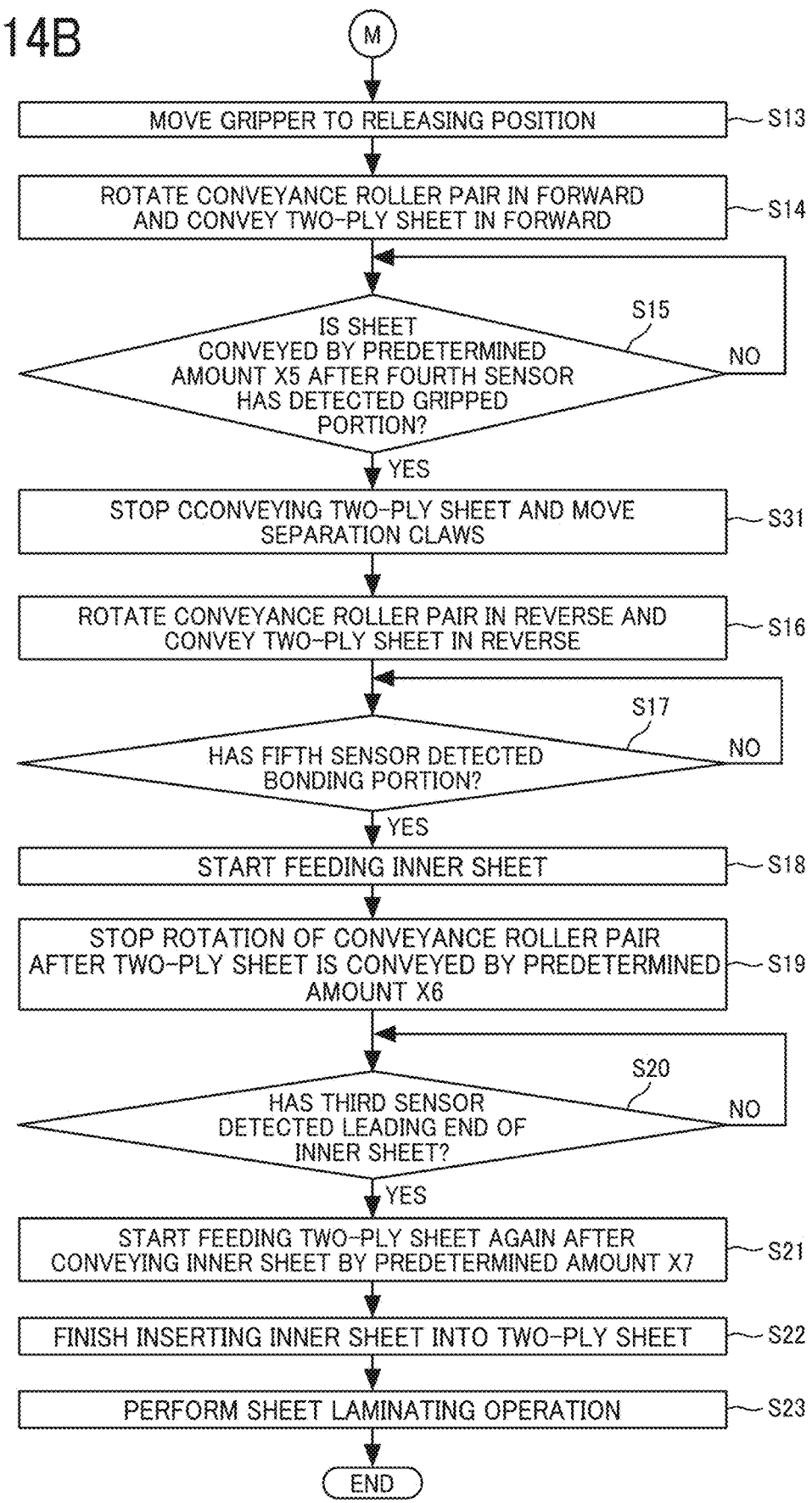

By contrast, when it is determined that the sheet lamination mode is selected as the print mode (YES in step S01 of FIG. 13), the control flow of the flowchart in FIG. 14 including FIGS. 14A and 14B is executed.

First, the sheet feed roller 2 and the first conveyance roller pair 4 start feeding the two-ply sheet PJ from the unit sheet feed tray 11 in step S1 of FIG. 14A. Then, as illustrated in FIG. 5A, the second conveyance roller pair 5 conveys the two-ply sheet PJ with the bonding portion A as a leading end of the two-ply sheet PJ in the forward direction that is a direction from the right side to the left side in FIGS. 5A to 5D in the third sheet conveyance passage K3.

At this time, the controller 500 controls the moving mechanism 30 so that the gripper 32 is positioned at the gripping position. That is, the cam 34 moves to a rotational position at which the cam 34 does not press the arm 31. When the gripper 32 is positioned at the gripping position as described above, the gripper 32 does not block conveyance of the sheet in the third sheet conveyance passage K3. The separation claws 16 stand by at the standby positions (illustrated in FIG. 11A) at which the separation claws 16 do not block conveyance of the sheet in the third sheet conveyance passage K3.

Then, as illustrated in FIG. 5B, the controller 500 determines whether the third sensor 43 has detected the bonding portion A of the two-ply sheet PJ (that is the leading end of the two-ply sheet PJ conveyed in the forward direction, in other words, the one end of the two-ply sheet PJ), in step S2 of FIG. 14A. When the third sensor 43 has not detected the bonding portion A of the two-ply sheet PJ (NO in step S2 of FIG. 14A), step S2 is repeated until the third sensor 43 detects the bonding portion A of the two-ply sheet PJ. By contrast, when the third sensor 43 has detected the bonding portion A of the two-ply sheet PJ (YES in step S2 of FIG. 14A), in response to the timing of detection of the bonding portion A of the two-ply sheet PJ by the third sensor 43, the controller 500 causes the third conveyance roller pair 6 to convey the two-ply sheet PJ in the forward direction by a predetermined amount X1 until the gripped portion B of the two-ply sheet PJ (that is the trailing end of the two-ply sheet PJ conveyed in the forward direction, in other words, the other end of the two-ply sheet PJ) passes the position of the winding roller 20, in step S3 of FIG. 14A. That is, the controller 500 determines whether the two-ply sheet PJ is conveyed by the predetermined amount X1. When the two-ply sheet PJ is not conveyed by the predetermined amount X1 (NO in step S3 of FIG. 14A), step S3 is repeated until the two-ply sheet is conveyed by the predetermined amount X1. By contrast, when the two-ply sheet PJ is conveyed by the predetermined amount X1 (YES in step S3 of FIG. 14A), the procedure goes to step S4.

As illustrated in FIG. 5C, the controller 500 causes the third conveyance roller pair 6 to temporarily stop conveyance of the two-ply sheet PJ conveyed by the predetermined amount X1 and causes the gripper 32 to move from the gripping position to the releasing position in step S4 of FIG. 14A. That is, the cam 34 moves to a rotational position at which the cam 34 pushes the arm 31. In this state, the gripped portion B of the two-ply sheet PJ is received between the gripper 32 and the receiving portion 20b.

Then, as illustrated in FIG. 5D, the controller 500 causes the third conveyance roller pair 6 to rotate in the reverse direction to start conveyance of the two-ply sheet PJ in the reverse direction in step S5 of FIG. 14A. At this time, the fourth sensor 44 detects the gripped portion B of the two-ply sheet PJ, that is, the other end of the two-ply sheet PJ and the leading end of the two-ply sheet PJ conveyed in the reverse direction.

Subsequently, the controller 500 determines whether the fourth sensor 44 has detected the gripped portion B of the two-ply sheet PJ, in step S6 of FIG. 14A. When the fourth sensor 44 has not detected the gripped portion B (NO in step S6 of FIG. 14A), step S6 is repeated until the fourth sensor 44 detects the gripped portion B of the two-ply sheet PJ. By contrast, when the fourth sensor 44 has detected the gripped portion B (YES in step S6 of FIG. 14A), as illustrated in FIG. 6A, in response to the timing of detection of the gripped portion B of the two-ply sheet PJ by the fourth sensor 44, the controller 500 causes the third conveyance roller pair 6 to convey the two-ply sheet PJ by a predetermined amount X2 until the gripped portion B of the two-ply sheet PJ reaches the position of the winding roller 20, that is, the winding start position W. Then, the controller 500 causes the third conveyance roller pair 6 to stop conveyance of the two-ply sheet PJ, in step S7 of FIG. 14A.

Then, as illustrated in FIG. 6B, the gripper 32 is moved from the releasing position to the gripping position in the state in which the gripped portion B of the two-ply sheet PJ is at the winding start position W, in step S8 of FIG. 14A. That is, the cam 34 moves to a rotational position at which the cam 34 does not press the arm 31. In this state, as illustrated in FIG. 6B', the end surface of the other end of the two-ply sheet PJ does not contact any member, and the gripped portion B of the two-ply sheet PJ is gripped between the gripper 32 and the receiving portion 20b.

Then, as illustrated in FIG. 6C, the winding roller 20 rotates in the reverse direction (that is, the counterclockwise direction) in a state in which the gripper 32 grips the two-ply sheet PJ, and the third conveyance roller pair 6 rotates again in the reverse direction together with the winding roller 20. At this time, as the winding roller 20 rotates, the gap C is formed between the first sheet P1 and the second sheet P2 of the two-ply sheet PJ between the winding roller 20 and the third conveyance roller pair 6, as illustrated in FIG. 6D. At this time, as the gap C is formed, the first guide 25 and the second guide 26 limit the warp (slack) of the two-ply sheet PJ in the vicinity of the winding roller 20. Accordingly, the gap C of the two-ply sheet PJ is intensively formed near the third conveyance roller pair 6.

Since the controller 500 determines the timing at which the gripper 32 and the receiving portion 20b grip the gripped portion B of the two-ply sheet PJ in response to the timing of detection of the leading end of the two-ply sheet PJ conveyed in the reverse direction by the fourth sensor 44 disposed downstream from the third conveyance roller pair 6 in the reverse direction, the gripped portion B of the two-ply sheet PJ is accurately conveyed to a desired gripping position regardless of variations in the sheet lengths with respect to the sheet conveyance amount X2. Note that the size of sheets includes an error even if the sheets are sold as the same size.

Further, by detecting the leading end of the two-ply sheet PJ conveyed in the reverse direction by the fourth sensor 44, the sheet conveyance amount X2 that is measured according to the detection is reduced regardless of the sheet length. Therefore, the above-described configuration reduces variation in the sheet conveyance amount X2 and accurately conveys the gripped portion B of the two-ply sheet PJ to the desired gripping position.

Accordingly, the fourth sensor 44 is preferably disposed near the winding roller 20.

Further, a description is given of a mechanism that generates the gap C in the two-ply sheet PJ, with reference to FIG. 6C'. The gap C is generated in the two-ply sheet PJ between the winding roller 20 and the third conveyance roller pair 6 by winding the two-ply sheet PJ around the winding roller 20.

The following description additionally indicates the mechanism.

The two-ply sheet PJ wound around the winding roller 20 is gripped by the gripper 32, restricting misalignment in the sheet. Therefore, a slip is generated between the first sheet P1 and the second sheet P2 by the amount of the circumferential length of the winding roller 20. As a result, the conveyance amount of the inner sheet (i.e., the first sheet P1) is smaller than the conveyance amount of the outer sheet (i.e., the second sheet P2). As a result, warp (slack) is generated in the inner sheet (i.e., the first sheet P1) between the nip region of the third conveyance roller pair 6 and the winding roller 20. At this time, as the two-ply sheet PJ is wound around the winding roller 20 one or more rounds, the difference in the winding circumferential length is generated between the inner circumference and the outer circumference additionally by the thickness of the sheet, which generates the warp (slack).

To be more specific, a distance from the rotary shaft 20a (i.e., the axial center) of the winding roller 20 to the second sheet P2 on the outer side of the winding roller 20 is R+ΔR, where a distance from the rotary shaft 20a (i.e., the axial center) of the winding roller 20 to the first sheet P1 on the inner side of the winding roller 20 is "R" and the thickness of the inner sheet (first sheet P1) is "ΔR". Since the radius of the first sheet P1 wound around the inner side of the winding roller 20 and the radius of the second sheet P2 wound around the outer side of the first sheet P1 are different by the thickness ΔR of the first sheet P1 (wound around the inner side of the winding roller 20), a circumferential length difference of 2×ΔR×π is generated between the inner sheet (first sheet P1) and the outer sheet (second sheet P2), when the two-ply sheet PJ is wound around the winding roller 20 by one round. Therefore, when the number of winding the two-ply sheet PJ around the winding roller 20 is M times, the slack of the inner sheet (first sheet P1) is generated by the circumferential length difference of 2×ΔR×π×M.

Finally, the warp (slack) is accumulated between the third conveyance roller pair 6 and the winding roller 20, and the gap C corresponding to 2×ΔR×π×M is formed between the first sheet P1 and the second sheet P2.

Then, the controller 500 causes the third conveyance roller pair 6 and the winding roller 20 to rotate in the reverse direction. At the timing at which the third conveyance roller pair 6 has conveyed the two-ply sheet PJ by a predetermined amount X3 since the start of winding of the two-ply sheet PJ by the winding roller 20, the controller 500 causes the third conveyance roller pair 6 to stop conveyance of the two-ply sheet PJ and the winding roller 20 to stop winding the two-ply sheet PJ, as illustrated in FIG. 7A, in step S9 of FIG. 14A. In this state, the two-ply sheet PJ is wound around the winding roller 20 one or more times, and the gap C in the two-ply sheet PJ (i.e., the distance between the first sheet P1 and the second sheet P2 in the vertical direction) is sufficiently widened if the two-ply sheet PJ is normally separated.

When the gap C is sufficiently widened, the controller 500 determines whether the sixth sensor 46 detects that the gap C equal to or larger than a predetermined distance F is formed in the two-ply sheet PJ, in step S29 of FIG. 14A.

As a result, when the controller 500 determines that the gap C is the sufficiently large gap equal to or greater than the predetermined size F (YES in step S29 of FIG. 14A), the controller 500 determines that the subsequent sheet separating operations of the separation claws 16 do not cause a problem and controls the separation claws 16 to insert into the gap C sufficiently widened in the two-ply sheet PJ, as illustrated in FIG. 7B, in step S10 of FIG. 14A. That is, as illustrated in FIGS. 10 and 11A, each of the separation claws 16 in pair is moved from the standby position to the separation position.

Then, as illustrated in FIG. 7C, the third conveyance roller pair 6 and the winding roller 20 start rotating in the forward direction, that is, in the clockwise direction, in step S11 of FIG. 14A, in the state in which the separation claws 16 are inserted in the gap C. That is, as illustrated in FIGS. 11A to 11C, the separation claws 16 that is inserted in the gap C of the two-ply sheet PJ relatively move from the one end (bonding portion A) to the other end (gripped portion B) with respect to the two-ply sheet PJ. Note that the above-described relative movement in the present embodiment is achieved by moving the two-ply sheet PJ itself in a direction indicated by arrow in FIGS. 11A to 11C without changing the positions of the separation claws 16 in the sheet conveyance direction.

Then, as illustrated in FIG. 8A, the controller 500 causes the third conveyance roller pair 6 and the winding roller 20 to stop rotating in the forward direction after the third conveyance roller pair 6 has conveyed the two-ply sheet PJ in the forward direction by a predetermined amount X4, in step S12 of FIG. 14A. At this time, the gripped portion B of the two-ply sheet PJ is positioned on the third sheet conveyance passage K3 (that is, at the winding start position W illustrated in FIG. 6B), which is a state in which the gripper 32 may release the gripped portion B. In addition, as illustrated in FIG. 11C, the separation claws 16 stop near the other end of the two-ply sheet PJ after the separation claws 16 are inserted into the gap C of the two-ply sheet PJ and relatively move to the other end (gripped portion B) of the two-ply sheet PJ with respect to the two-ply sheet PJ.

In this state, the gripper 32 moves from the gripping position to the releasing position in step S13 of FIG. 14B. That is, the cam 34 moves to a rotational position at which the cam 34 does not press the arm 31. This state indicates that the gripper 32 releases the two-ply sheet PJ from the gripping. Note that, in the present embodiment, the cam 34 in the moving mechanism 30 moves to release the gripping of the gripper 32. However, in a case in which the pulling force by conveyance of the two-ply sheet PJ by the third conveyance roller pair 6 is greater than the gripping force of the gripper 32 to grip the two-ply sheet PJ, the gripping of the two-ply sheet PJ by the gripper 32 is released by pulling the two-ply sheet PJ from the gripper 32 due to conveyance of the two-ply sheet PJ without moving the cam 34 in the moving mechanism 30.

Thereafter, as illustrated in FIG. 8B, the controller 500 causes the third conveyance roller pair 6 to rotate in the forward direction again to start conveyance of the two-ply sheet PJ in the forward direction, in step S14 of FIG. 14B. In addition, after the gripped portion B of the two-ply sheet PJ, that is, the other end of the two-ply sheet PJ and the trailing end of the two-ply sheet PJ, passes over the branch portion between the third sheet conveyance passage K3 and each of the first branched sheet conveyance passage K4 and the second branched sheet conveyance passage K5, the gripper 32 moves from the releasing position to the gripping position. Further, at this time, the fourth sensor 44 detects the gripped portion B of the two-ply sheet PJ, that is, the other end of the two-ply sheet PJ and the trailing end of the two-ply sheet PJ conveyed in the forward direction. Then, the controller 500 determines whether the third conveyance roller pair 6 has conveyed the two-ply sheet PJ by a predetermined amount X5 in response to the timing at which the fourth sensor 44 detects the trailing end of the two-ply sheet PJ conveyed in the forward direction, in step S15 of FIG. 14B. When the third conveyance roller pair 6 has not conveyed the two-ply sheet PJ by the predetermined amount X5 (NO in step S15 of FIG. 14B), step S15 is repeated until the third conveyance roller pair 6 conveys the two-ply sheet PJ by the predetermined amount X5. By contrast, when the third conveyance roller pair 6 conveyed the two-ply sheet PJ by the predetermined amount X5 (YES in step S15 of FIG. 14B), as illustrated in FIG. 11D, the controller 500 then causes the third conveyance roller pair 6 to stop conveying the two-ply sheet PJ and causes the separation claws 16 to move in the width direction of the two-ply sheet PJ, in step S31 of FIG. 14B. As a result, as illustrated in FIG. 8B, the trailing ends of the first sheet P1 and the second sheet P2 of the two-ply sheet PJ conveyed in the forward direction are separated and largely opened (see FIG. 11D). At this time, the controller 500 starts to perform the sheet separating operation on the two-ply sheet PJ.

Then, as illustrated in FIG. 8C, the third conveyance roller pair 6 rotates in the reverse direction to start conveying the two-ply sheet PJ in the reverse direction, in step S16 of FIG. 14B. At this time, since the separation claws 16 are disposed at the switching positions at which the separation claws 16 block the two-ply sheet PJ moving to the third sheet conveyance passage K3 (that is, the position illustrated in FIG. 11D), the first sheet P1 and the second sheet P2 separated each other are guided to the first branched sheet conveyance passage K4 and the second branched sheet conveyance passage K5, respectively, as illustrated in FIG. 8C. At this time, the fifth sensor 45 (see FIG. 2) detects the bonding portion A of the two-ply sheet PJ, that is, the one end of the two-ply sheet PJ and the trailing end of the two-ply sheet PJ conveyed in the reverse direction. Subsequently, the controller 500 determines whether the fifth sensor 45 (see FIG. 2) that functions as a sheet detector has detected the trailing end of the two-ply sheet P3 conveyed in the reverse direction, that is, the bonding portion A, in step S17 of FIG. 14B. When the fifth sensor 45 has not detected the trailing end of the two-ply sheet PJ (NO in step S17 of FIG. 14B), step S17 is repeated until the fifth sensor 45 detects the trailing end of the two-ply sheet PJ. By contrast, when the fifth sensor 45 has detected the trailing end of the two-ply sheet PJ (YES in step S17 of FIG. 14B), in response to the timing of detection of the trailing end of the two-ply sheet PJ in the reverse direction by the fifth sensor 45 (see FIG. 2), the controller 500 causes the sheet feed roller 197 to feed the inner sheet PM from the main sheet feed tray 112, in step S18 of FIG. 14B.

Note that the timing at which the sheet feed roller 197 starts to feed the inner sheet PM is not limited to the above-described timing. It is preferable to set the timing to reduce the time required for the sheet lamination mode depending on the time required for printing an image on the inner sheet PM in the housing 100a of the image forming apparatus 100. That is, it is preferable that the controller 500 starts to perform the sheet inserting operation of the inner sheet PM immediately after completion of the sheet separating operation of the two-ply sheet PJ.

Figure 9A:
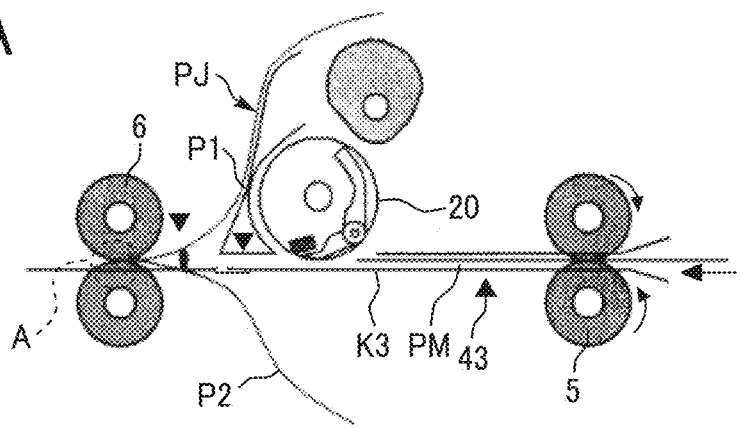
FIGS. 9A to 9C are schematic views, each illustrating the sheet separating operation performed in the sheet separator, subsequent from the sheet separating operation of FIGS. 8A to 8C.

Subsequently, as illustrated in FIG. 9A, in response to the timing of detection of the trailing end of the two-ply sheet PJ in the reverse direction by the fifth sensor 45 (see FIG. 2), the controller 500 causes the third conveyance roller pair 6 to rotate to convey the two-ply sheet PJ by a predetermined amount X6, and stop the conveyance of the two-ply sheet PJ when the two-ply sheet PJ has been conveyed by the predetermined amount X6, in step S19 of FIG. 14B. When the third conveyance roller pair 6 conveys the two-ply sheet PJ by the predetermined amount X6, the bonding portion A of the two-ply sheet PJ is in the nip region of the third conveyance roller pair 6 or at a position slightly leftward from the nip region of the third conveyance roller pair 6. That is, the third conveyance roller pair 6 nips the one end of the two-ply sheet PJ. Then, this state is a state in which the sheet separating operation of the two-ply sheet PJ is completed.

Further, before completion of the sheet separating operation of the two-ply sheet PJ, the inner sheet PM has already been fed from the main sheet feed tray 112 and the print operation on the inner sheet PM has substantially been completed. Therefore, as illustrated in FIG. 9A, when the sheet separating operation on the two-ply sheet PJ is completed, the leading end of the inner sheet PM (i.e., at one end of the inner sheet PM in the forward direction) has approached the position at which the inner sheet PM is inserted between the first sheet P1 and the second sheet P2 constructing the two-ply sheet PJ.

Figure 9B:
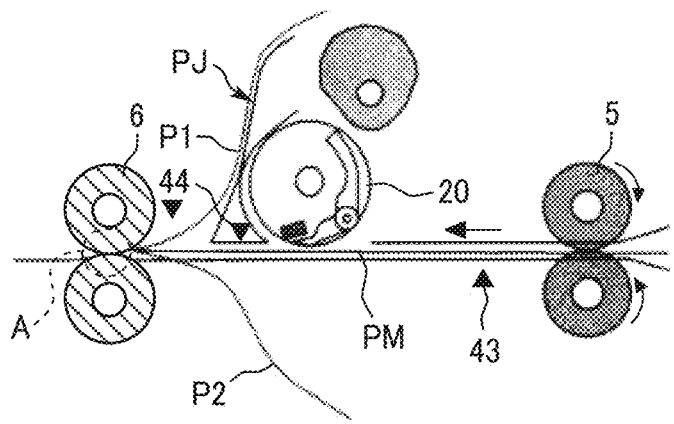

On the other hand, the third sensor 43 detects the leading end of the inner sheet PM (i.e., at one end of the inner sheet PM in the forward direction). In addition, as illustrated in FIG. 9B, in response to the detection timing, the separation claws 16 move to the respective standby positions at the timing at which the separation claws 16 do not block conveyance of the inner sheet PM.

Figure 9C:
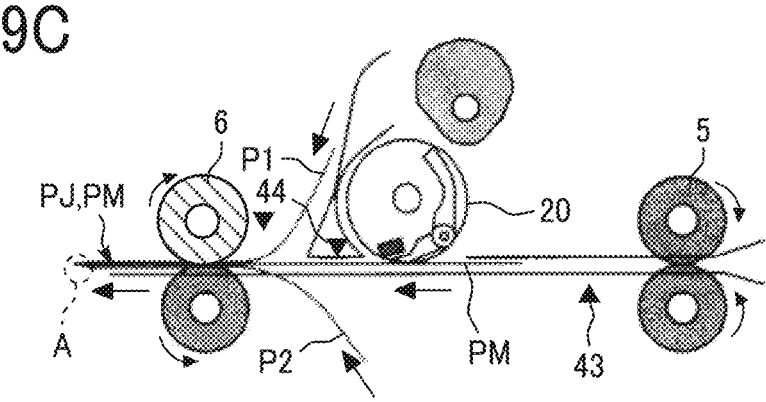
Figure 11E:
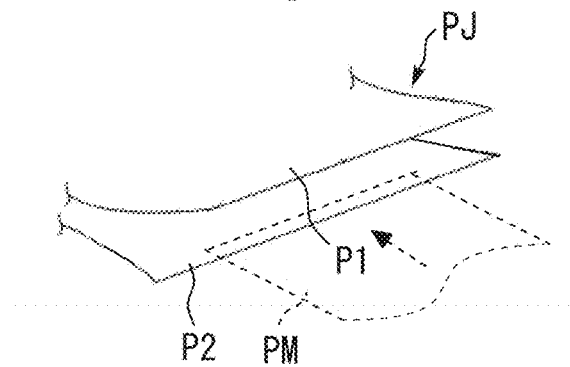

Further, as illustrated in FIGS. 9C and 11E, the controller 500 determines whether the third sensor 43 has detected the leading end of the inner sheet PM in the forward direction, in step S20 of FIG. 14B. When the third sensor 43 has not detected the leading end of the inner sheet PM in the forward direction (NO in step S20 of FIG. 14B), step S20 is repeated until the third sensor 43 has not detected the leading end of the inner sheet PM in the forward direction. By contrast, when the third sensor 43 has detected the leading end of the inner sheet PM in the forward direction (YES in step S20 of FIG. 14B), in response to the detection timing, the controller 500 causes the second conveyance roller pair 5 to convey the inner sheet PM by a predetermined amount X7. Then, the controller 500 causes the third conveyance roller pair 6 to start conveying the two-ply sheet PJ in the forward direction again, in step S21 of FIG. 14B. At this time, the inner sheet PM is accurately nipped at a desired position between the first sheet P1 and the second sheet P2 of the two-ply sheet PJ.

Thus, the controller 500 finishes the sheet inserting operation to insert the inner sheet PM in the two-ply sheet PJ, in other words, between the first sheet P1 and the second sheet P2 of the two-ply sheet PJ (step S22 of FIG. 14B).

Thereafter, the controller 500 causes the third conveyance roller pair 6 to convey the two-ply sheet PJ (in which the inner sheet PM has been inserted after the sheet separating operation) to pass through the fourth sheet conveyance passage K6, and is then conveyed to the sheet lamination device 51. After the two-ply sheet PJ passes through the sheet lamination device 51, the entire region of the two-ply sheet PJ is bonded with the inner sheet PM being inserted (step S23 of FIG. 14B). Then, the two-ply sheet PJ on which the sheet laminating operation is performed as described above is ejected to the outside of the sheet lamination device 51 by an ejection roller pair 7 and is stacked on the ejection tray 13.

As described above, the sheet separator 50 according to the present embodiment performs the sheet laminating operation as a sequence of the following operations, an operation to feed the two-ply sheet PJ; an operation to separate the first sheet P1 and the second sheet P2 of the two-ply sheet PJ; an operation to insert the inner sheet PM into the space between the first sheet P1 and the second sheet P2; and an operation to perform the sheet laminating operation, on the two-ply sheet PJ in which the inner sheet PM is inserted. By so doing, the user convenience for the sheet separator 50 is enhanced.

By contrast, when the controller 500 determines that the gap C in the two-ply sheet PJ is not the sufficiently large gap equal to or greater than the predetermined distance F (NO in step S29 of FIG. 14A), that is, when the controller 500 determines that the abnormal state occurs based on the results detected by the sixth sensor 46, the controller 500 determines that the subsequent sheet separating operations of the separation claws 16 cause various kinds of problems, and therefore does not move the separation claws 16 from the standby positions to the separation positions. At this time, the controller 500 causes the operation display panel 49 (see FIG. 2) to notify that the occurrence of the abnormal state stops the sheet separating operation of the two-ply sheet PJ and the sheet inserting operation of the inner sheet PM, in step S30 of FIG. 14A.

Variation 1

Figure 16:
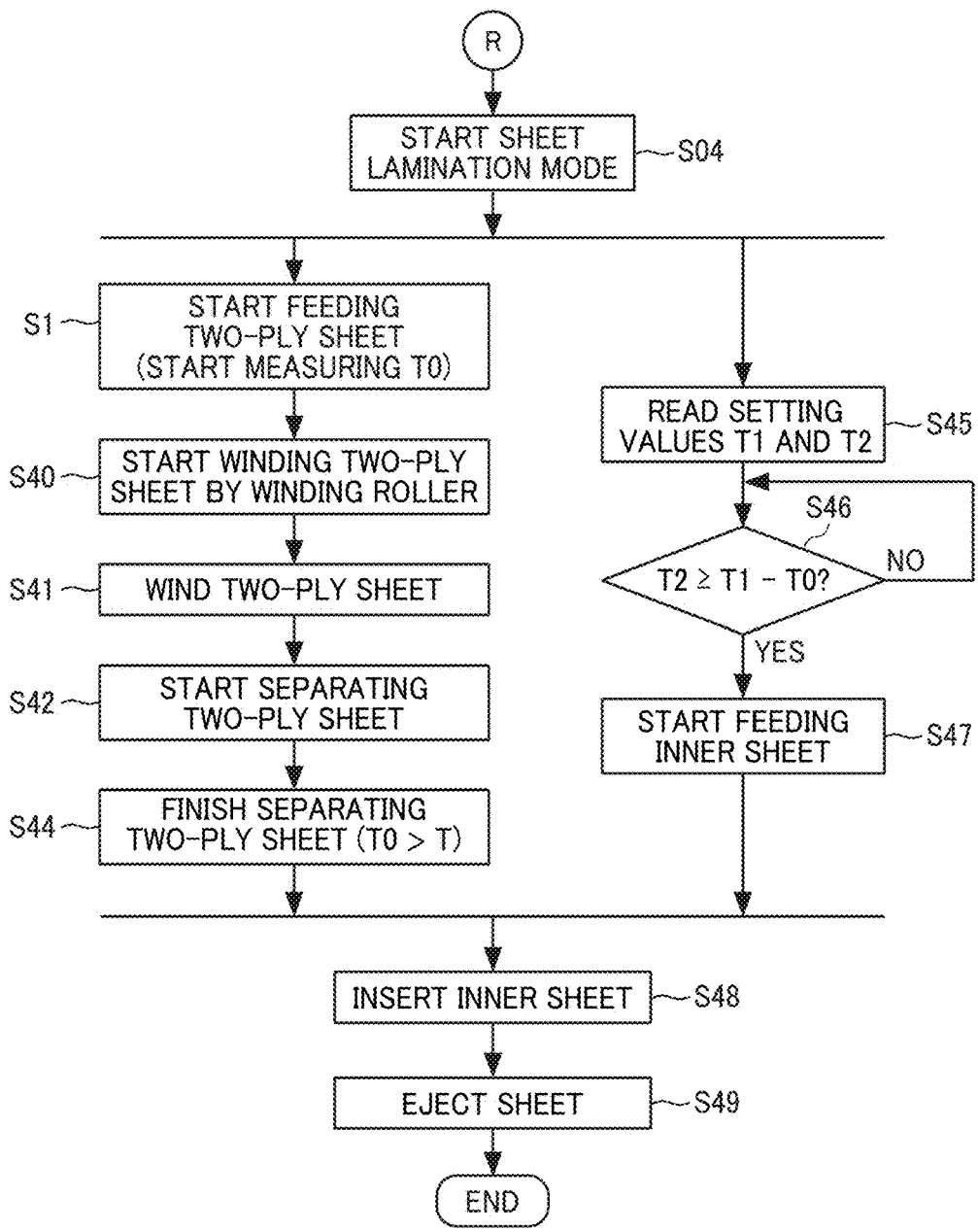
FIG. 16 is a flowchart illustrating the control process executed in the sheet separator, according to Variation 1.

Next, a description is given of the image forming apparatus 100 according to Variation 1, with reference to the flowchart of FIG. 16.

FIG. 16 is a flowchart illustrating the control process executed in the sheet separator 50 of the image forming apparatus 100, according to Variation 1.

In the image forming apparatus 100 according to Variation 1, the controller 500 controls to cause the main sheet feed tray 112 and the sheet feed roller 197 (each functioning as a second sheet feeder) to start feeding the inner sheet PM after the unit sheet feed tray 11 and the sheet feed roller 2 (each functioning as a first sheet feeder) fed out the two-ply sheet PJ and before the operation to separate the non-bonding portion of the two-ply sheet PJ is completed.

Here, in the image forming apparatus 100 according to Variation 1, the timing to feed the inner sheet PM from the main sheet feed tray 112 is adjusted based on a time T1 and a time T2. The time T1 is a time required from when the controller 500 starts feeding the two-ply sheet PJ from the unit sheet feed tray 11 to when the controller 500 finishes the sheet separating operation of the two-ply sheet PJ (that is, to the state illustrated in FIG. 9B). The time T2 is a time required from w % ben the controller 500 starts feeding the inner sheet PM from the main sheet feed tray 112 to when the inner sheet PM reaches the sheet separation device 1 (that is, the nip region of the third conveyance roller pair 6). At this time, a timer of the controller 500 measures a measurement time T0 from when the controller 500 starts feeding the two-ply sheet PJ from the unit sheet feed tray 11. Further, the above-described time T1 is a value that changes according to the size of the two-ply sheet PJ and is determined based on each size.

Specifically, as illustrated in FIG. 16, when the controller 500 determines that the sheet laminating operation is selected in step S01 in FIG. 13, the controller 500 starts the sheet laminating operation (step S04 of FIG. 16).

First, the controller 500 causes the sheet feed roller 2 (first sheet feeder) to start feeding the two-ply sheet PJ from the unit sheet feed tray 11 (first sheet feeder) (step S1 of FIG. 16), and then causes the winding roller 20 to start winding the two-ply sheet PJ (step S40 of FIG. 16). The above-described operations are same as the operations in steps S1 to S8 in FIG. 14A. Further, in step S1 of FIG. 16, the controller 500 starts measuring the measurement time T0 in synchrony with the timing of the start of feeding the two-ply sheet PJ.

Then, after the winding roller 20 wound the two-ply sheet PJ, in other words, the winding operation on the two-ply sheet PJ is completed (step S41 of FIG. 16), the controller 500 causes the separation claws 16 to start separating the two-ply sheet PJ, in other words, to perform the sheet separating operation on the two-ply sheet PJ (step S42 of FIG. 16). Consequently, the sheet separating operation (sheet separation) on the two-ply sheet PJ is completed (step S44 of FIG. 16). At this time, the measurement time T0 is greater than the time T1 (T0>T1), and the sheet inserting operation on the inner sheet PM is ready to be performed.

On the other hand, when the controller 500 starts the sheet laminating operation, in other words, when the sheet lamination mode is started in step S04 of FIG. 16, the controller 500 starts reading the times T1 and T2 that are previously set by the controller 500 (step S45 of FIG. 16). Then, the controller 500 determines whether the relation of the time T2≥the time T1−the measurement time T0 is met (step S46 of FIG. 16). When the relation is not met (NO in step S46), step S46 is repeated until the equation is met. By contrast, when the relation is met, that is, step S46 is YES, immediately after the relation is met, the controller 500 starts feeding the inner sheet PM from the main sheet feed tray 112 (step S47 of FIG. 16). Here, the relation of the time T2≥the time T1−the measurement time T0 is a condition for the inner sheet PM fed from the main sheet feed tray 112 to reach the sheet separation device 1 after completion of the sheet separating operation of the two-ply sheet PJ.

Further, the controller 500 causes the third conveyance roller pair 6 to rotate to insert the inner sheet PM into the two-ply sheet PJ, in other words, to perform the sheet inserting operation on the inner sheet PM (step S48 of FIG. 16). Then, the controller 500 causes the third conveyance roller pair 6 and the ejection roller pair 7 to eject the two-ply sheet PJ in which the inner sheet PM is inserted, to the ejection tray 13 on which the two-ply sheet PJ is stacked (step S49 of FIG. 16).

Variation 2

Figure 17:
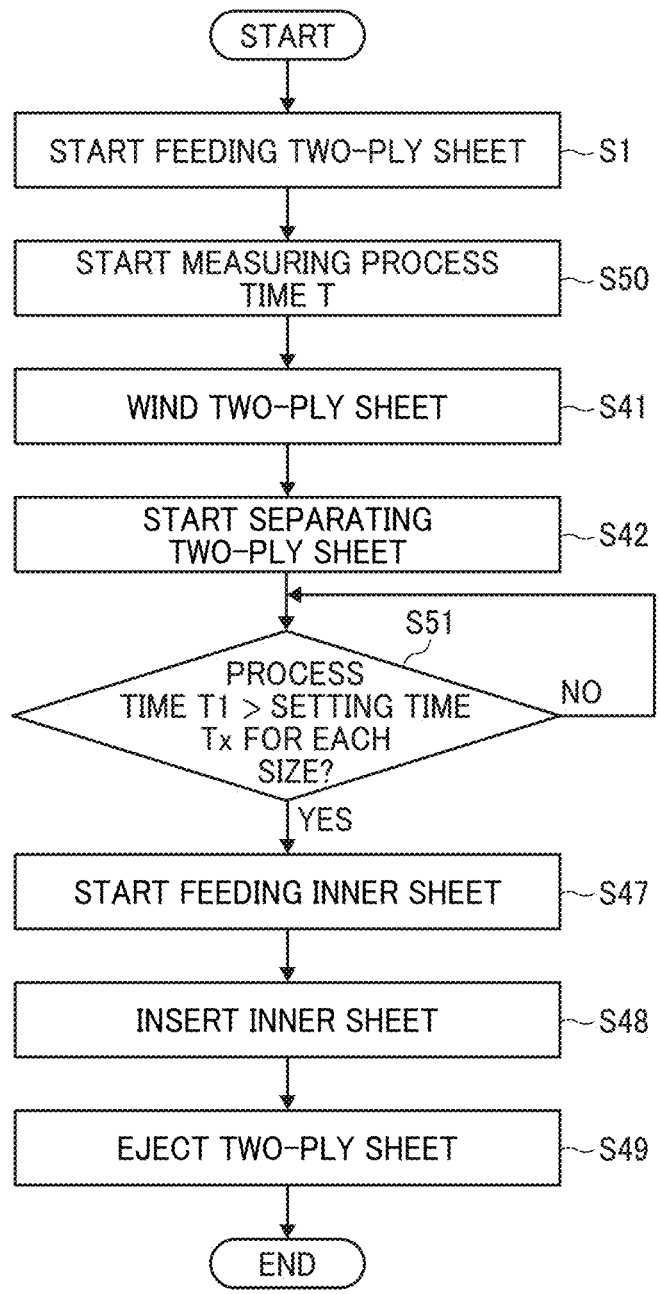
FIG. 17 is a flowchart illustrating the control process executed in the sheet separator, according to Variation 2.

Next, a description is given of the image forming apparatus 100 according to Variation 1, with reference to the flowchart of FIG. 17.

FIG. 17 is a flowchart illustrating the control process executed in the sheet separator 50 of the image forming apparatus 100, according to Variation 2.

In the image forming apparatus 100 according to Variation 2, the controller 500 causes the sheet feed roller 197 (functioning as a second sheet feeder) to start feeding the inner sheet PM from the main sheet feed tray 112 (functioning as a second sheet feeder) after the controller 500 has caused the sheet feed roller 2 (functioning as a first sheet feeder) to start feeding the two-ply sheet PJ from the unit sheet feed tray 11 (functioning as a first sheet feeder) and after a set time Tx that is previously set for each size of the two-ply sheet PJ in the sheet feed direction (sheet conveyance direction) has elapsed from the start of feeding the two-ply sheet by the sheet feed roller 2.

Specifically, since the time from the start of feeding the two-ply sheet PJ to the end of the sheet separating operation is substantially constant, the feeding of the inner sheet PM may start before the end of the sheet separating operation based on the time from the start of feeding the two-ply sheet PJ. Therefore, the time from the start to the end of the sheet separating operation in the image forming apparatus 100 (i.e., the sheet separator 50) is reduced. However, the time from the start of feeding the two-ply sheet PJ to the end of the sheet separating operation takes longer when the size of the two-ply sheet PJ in the sheet feed direction is greater than the size of the inner sheet PM in the sheet feed direction, than when compared with a case in which the size of the two-ply sheet PJ in the sheet feed direction is smaller than the size of the inner sheet PM in the sheet feed direction. Therefore, in Variation 2, the start timing of feeding the inner sheet PM is slower when the size of the two-ply sheet PJ in the sheet feed direction is greater than the size of the inner sheet PM in the sheet feed direction, than when the size of the two-ply sheet PJ in the sheet feed direction is smaller than the size of the inner sheet PM in the sheet feed direction.

To be more specific, as illustrated in FIG. 17, the controller 500 causes the unit sheet feed tray 11 and the sheet feed roller 2 (each functioning as a first sheet feeder) to start feeding the two-ply sheet PJ (step S1 of FIG. 17), and then starts measuring the operation time T (step S50 of FIG. 17). Thereafter, as illustrated in FIG. 17, the controller 500 causes the winding roller 20 to wind the two-ply sheet PJ, in other words, to perform the winding operation on the two-ply sheet PJ (step S41 of FIG. 17). Then, the controller 500 causes the separation claws 16 to start separating the two-ply sheet PJ, in other words, to perform the sheet separating operation on the two-ply sheet PJ (step S42 of FIG. 17). Then, the controller 500 determines whether the operation time T measured in step S50 has reached the set time Tx for each size (step S51 of FIG. 14). Then, when the operation time T has not reached the set time Tx (NO in step S51 of FIG. 17), step S51 is repeated until the operation time T reaches the set time Tx. By contrast, when the operation time T has reached the set time Tx (YES in step S51 of FIG. 17), the controller 500 causes the sheet feed roller 197 (second sheet feeder) to start feeding the inner sheet PM from the main sheet feed tray 112 (second sheet feeder) (step S47 of FIG. 17). Further, the controller 500 causes the third conveyance roller pair 6 to rotate to insert the inner sheet PM into the two-ply sheet PJ, in other words, to perform the sheet inserting operation on the inner sheet PM (step S48 of FIG. 16). Then, the controller 500 causes the third conveyance roller pair 6 and the ejection roller pair 7 to eject the two-ply sheet PJ in which the inner sheet PM is inserted, to the ejection tray 13 on which the two-ply sheet PJ is stacked (step S49 of FIG. 16).

The above-described control also enhances the productivity of the image forming apparatus 100.

Variation 3

Figure 19:
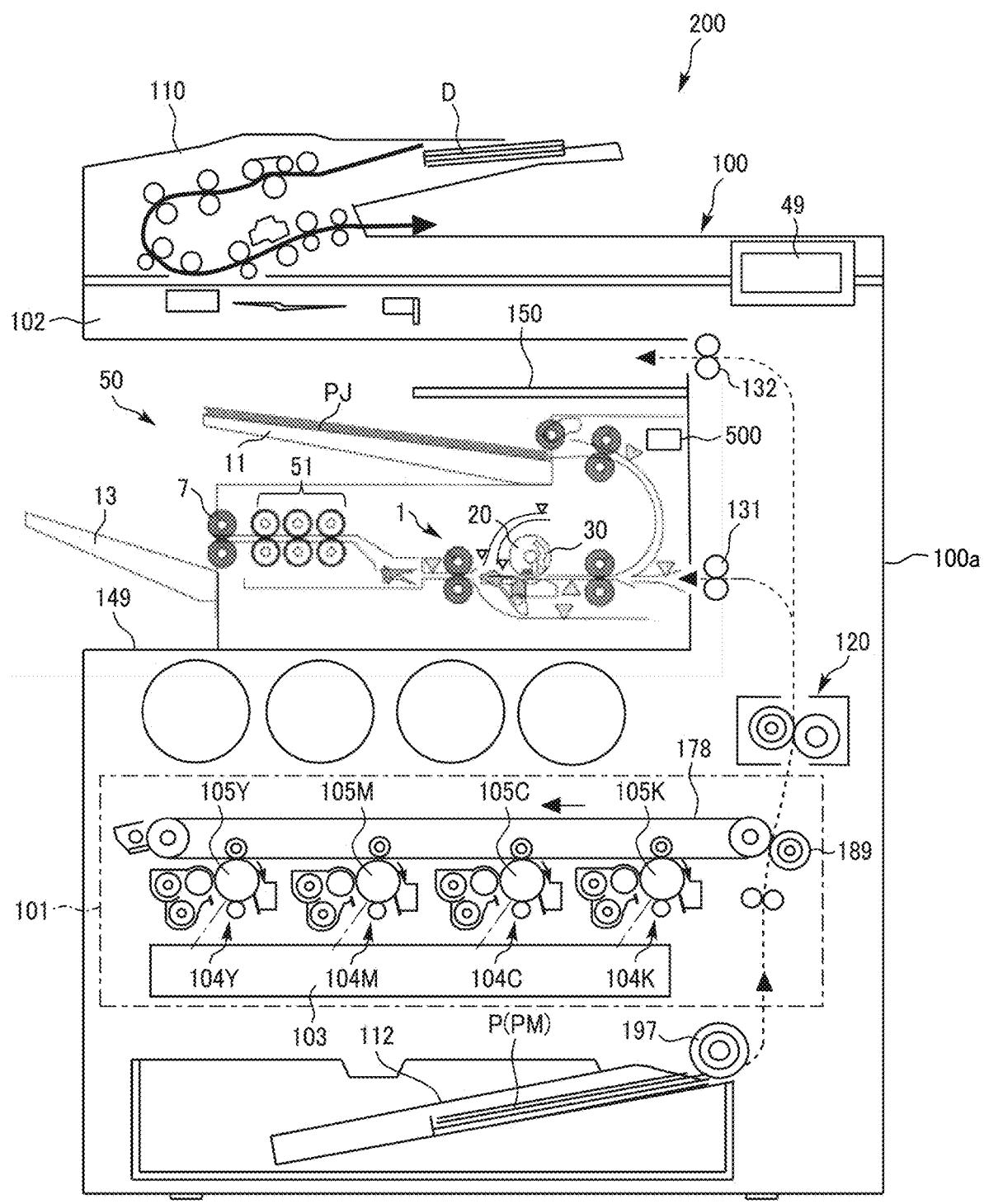
FIG. 19 is a schematic view illustrating an image forming system, according to Variation 4.

Next, a description is given of the sheet separator 50 of the image forming apparatus 100 according to Variation 4, with reference to FIG. 19.

FIG. 19 is a flowchart illustrating the control process executed in the sheet separator 50 of the image forming apparatus 100, according to Variation 4.

The sheet separator 50 according to Variation 4 includes the seventh sensor 47 and the eighth sensor 48, each functioning as a sheet separation sensor (see FIG. 2) to detect the state in which the non-bonding portion of the two-ply sheet PJ is successfully separated.

Specifically, the seventh sensor 47 is disposed in the first branched sheet conveyance passage K4 to optically detect whether the first sheet P1 that is one of the separated sheets of the two-ply sheet PJ has reached the position of the seventh sensor 47. Further, the eighth sensor 48 is disposed in the second branched sheet conveyance passage K5 to optically detect whether the second sheet P2 that is the other of the separated sheets of the two-ply sheet PJ has reached the position of the eighth sensor 48. Therefore, after a certain time has elapsed since the sheet separating operation of the two-ply sheet PJ started and, at the same time, when neither of the seventh sensor 47 and the eighth sensor 48 has detected the sheet (i.e., the first sheet P1 and the second sheet P2), the controller 500 determines that the two-ply sheet PJ has not been separated successfully. Note that, in Variation 3, in a case in which such an abnormality is detected, the controller 500 causes the operation display panel 49 to display the abnormality state. Further, the position to set the seventh sensor 47 and the position to set the eighth sensor 48 are sufficiently upstream (i.e., close to the bonding portion A) from the position of the leading end (the other end) of the first sheet P1 and the leading end (the other end) of the second sheet P2 in the sheet conveyance direction when the sheet separating operation of the two-ply sheet PJ is completed. According to this configuration, the seventh sensor 47 and the eighth sensor 48 are set to detect the first sheet P1 and the second sheet P2, respectively, at the timing before completion of the sheet separating operation of the two-ply sheet PJ.

Then, in Variation 3, the controller 500 causes the main sheet feed tray 112 and the sheet feed roller 197 (each functioning as a second sheet feeder) to start feeding the inner sheet PM based on the detection results of the seventh sensor 47 and the eighth sensor 48, each functioning as a sheet separation detector. That is, as in the above-described variations, in Variation 3, the controller 500 causes the main sheet feed tray 112 and the sheet feed roller 197 (each functioning as a second sheet feeder) to start feeding the inner sheet PM according to the time at which the sheet separation device 1 completed the sheet separating operation.

Figure 18:
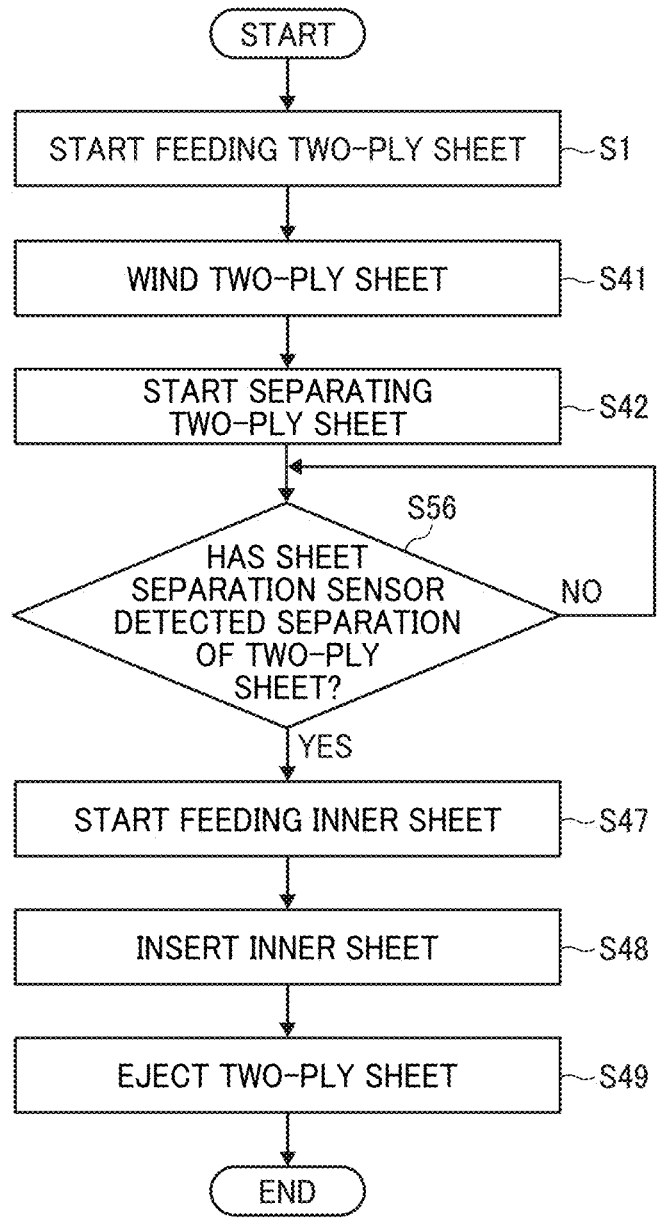
FIG. 18 is a flowchart illustrating the control process executed in the sheet separator, according to Variation 3.

To be more specific, as illustrated in FIG. 18, the controller 500 causes the unit sheet feed tray 11 and the sheet feed roller 2 (each functioning as a first sheet feeder) to start feeding the two-ply sheet PJ (step S1 of FIG. 18). Then, the controller 500 causes the winding roller 20 to wind the two-ply sheet PJ, in other words, to perform the winding operation on the two-ply sheet PJ (step S41 of FIG. 18). Then, the controller 500 causes the separation claws 16 to start separating the two-ply sheet PJ, in other words, to perform the sheet separating operation on the two-ply sheet PJ (step S42 of FIG. 18).

Then, the controller 500 determines whether the seventh sensor 47 and the eighth sensor 48 detected normal separation of the two-ply sheet PJ (step S56 of FIG. 18). Then, when the seventh sensor 47 and the eighth sensor 48 did not detected normal separation of the two-ply sheet PJ (NO in step S56 of FIG. 18), step S56 is repeated until the seventh sensor 47 and the eighth sensor 48 detect normal separation of the two-ply sheet PJ. On the other hand, when the seventh sensor 47 and the eighth sensor 48 detected normal separation of the two-ply sheet PJ (YES in step S56 of FIG. 18), the controller 500 causes the sheet feed roller 197 (second sheet feeder) to start feeding the inner sheet PM from the main sheet feed tray 112 (second sheet feeder) (step S47 of FIG. 18). Further, the controller 500 causes the third conveyance roller pair 6 to rotate to insert the inner sheet PM into the two-ply sheet PJ, in other words, to perform the sheet inserting operation on the inner sheet PM (step S48 of FIG. 18). Then, the controller 500 causes the third conveyance roller pair 6 and the ejection roller pair 7 to eject the two-ply sheet PJ in which the inner sheet PM is inserted, to the ejection tray 13 on which the two-ply sheet PJ is stacked (step S49 of FIG. 18).

The above-described control also enhances the productivity of the image forming apparatus 100.

In particular, in Variation 3, the controller 500 starts feeding the inner sheet PM after checking the state in which the two-ply sheet PJ is successfully separated. Therefore, this configuration in Variation 3 prevents the inconvenience in which the inner sheet PM is fed in a state in which the two-ply sheet PJ has not been separated successfully, resulting in waste of the inner sheet PM.

Variation 4

A description is given of an image forming system according to Variation 4, with reference to FIG. 19.

FIG. 19 is a schematic view illustrating an image forming system 200, according to Variation 4.

As illustrated in FIG. 19, the image forming system 200 according to Variation 4 includes the image forming apparatus 100 and the sheet separator 50. The image forming apparatus 100 of the image forming system 200 according to Variation 4 includes the housing 100a that holds (includes) the image forming device 101, the fixing device 120 that functions as a heat source, and the main sheet feed tray 112 that functions as a second sheet feeder. The sheet separator 50 of the image forming system 200 according to Variation 4 includes the sheet separation device 1 and the unit sheet feed tray 11 that functions as a first sheet feeder. The sheet separator 50 is detachably attached to (the housing 100a of) the image forming apparatus 100. The sheet separator 50 further includes the sheet lamination device 51.

In the image forming system 200 according to Variation 4 illustrated in FIG. 19, the image forming apparatus 100 performs the image forming operations on the sheet P, as described above with reference to FIG. 1. Then, the image forming apparatus 100 ejects the sheet P (that is, the inner sheet PM on which a desired image is formed) from the ejection roller pair 131 to the sheet separator 50. Then, after the sheet P is conveyed to the sheet separator 50, the sheet P is inserted into the two-ply sheet PJ, where the sheet separator 50 performs the sheet laminating operation on the two-ply sheet PJ. Then, the ejection roller pair 7 ejects the two-ply sheet PJ to the outside of the sheet separator 50 to stack the two-ply sheet PJ in which the inner sheet PM is inserted, on the ejection tray 13.

When the above-described sheet laminating operation is not performed, the image forming apparatus 100 of the image forming system 200 according to Variation 4 ejects the sheet P having the image formed in the image forming operations, from a second ejection roller pair 132 to the outside of the image forming apparatus 100, so as to stack the sheet P on a second ejection tray 150.

As described above, the sheet separator 50 is detachably attached to the housing 100a of the image forming apparatus 100. When the sheet separator 50 is not used, the sheet separator 50 may be detached from the image forming apparatus 100. In a case in which the sheet separator 50 is removed from the image forming apparatus 100, a placement surface 149 on which the sheet separator 50 was installed functions as an ejection tray, and the sheet P that is ejected from the ejection roller pair 131 to the outside of the image forming apparatus 100 is stacked on the placement surface 149, in other words, the sheet P on which a desired image is formed is stacked on the placement surface 149.

As described above, the image forming apparatus 100 according to the present embodiment includes the sheet separation device 1 that performs the sheet separating operation and the sheet inserting operation, and the unit sheet feed tray 11 and the sheet feed roller 2 (each functioning as a first sheet feeder) to feed the two-ply sheet PJ. To be more specific, the sheet separation device 1 performs the sheet separating operation to separate the non-bonding portion of the two-ply sheet PJ in which two sheets, which are the first sheet P1 and the second sheet P2, are overlapped and bonded together at one end of the two-ply sheet PJ as the bonding portion A of the two-ply sheet PJ. The image forming apparatus 100 according to the present embodiment further includes the main sheet feed tray 112 and the sheet feed roller 197 (each functioning as a second sheet feeder) and the image forming device 101. To be more specific, the main sheet feed tray 112 and the sheet feed roller 197 feed the inner sheet PM to be inserted between the first sheet P1 and the second sheet P2 of the two-ply sheet PJ in which the non-bonding portion is separated in the sheet separation device 1. The image forming device 101 forms an image on the surface of the inner sheet PM that is fed from the main sheet feed tray 112 and is in the sheet conveyance direction. Then, in the sheet separation device 1 of the sheet separator 50 of the image forming apparatus 100 according to the present embodiment, the controller 500 causes the sheet feed roller 197 to feed the inner sheet PM from the main sheet feed tray 112 after the controller 500 caused the sheet feed roller 2 to feed the two-ply sheet PJ from the unit sheet feed tray 11 and before the operation to separate the non-bonding portion of the two-ply sheet PJ is completed.

Accordingly, the time required from when the two-ply sheet PJ is fed from the unit sheet feed tray 11 to when the inner sheet PM is completely inserted in the two-ply sheet PJ is reduced, and therefore the productivity of the sheet separation device 1 is enhanced.

Note that, in the present embodiment, the first branched sheet conveyance passage K4 and the second branched sheet conveyance passage K5 branch off in different directions from the third sheet conveyance passage K3 (sheet conveyance passage) between the separation claws 16 each functioning as a separator and the winding roller 20. By contrast, the first branched sheet conveyance passage K4 and the second branched sheet conveyance passage K5 may branch off at the position of the separation claws 16 (each functioning as a separator) in different directions from the third sheet conveyance passage K3 (sheet conveyance passage), resulting that the third sheet conveyance passage K3 is interposed between the first branched sheet conveyance passage K4 and the second branched sheet conveyance passage K5.

Further, in the present embodiment, the first branched sheet conveyance passage K4 and the second branched sheet conveyance passage K5 are formed in a substantially U shape extending from the branch portion to the right side of FIG. 2. However, the shape of the first branched sheet conveyance passage K4 and the second branched sheet conveyance passage K5 is not limited to the above-described U shape. For example, the first branched sheet conveyance passage K4 and the second branched sheet conveyance passage K5 may be formed in a substantially U shape extending from the branch portion to the left in FIG. 2 or may be formed in a substantially S shape extending from the branch portion to both the left and right in FIG. 2.

Further, even when the above-described sheet separation devices are applied, these sheet separation devices achieve the same effect as the effect provided by the configuration(s) in the present embodiment.

Note that embodiments of the present disclosure are not limited to the above-described embodiments and it is apparent that the above-described embodiments can be appropriately modified within the scope of the technical idea of the present disclosure in addition to what is suggested in the above-described embodiments. Further, features of components of the embodiments, such as the number, the position, and the shape are not limited to the embodiments and thus may be preferably set to be applied to the present disclosure.

Note that, in the present disclosure, the "end surface" of the two-ply sheet is defined as a side surface extending in the thickness direction and connecting the front surface and the back surface of the two-ply sheet. Accordingly, there are four end surfaces of the rectangular two-ply sheet on the front, back, left, and right.

The present disclosure is not limited to specific embodiments described above, and numerous additional modifications and variations are possible in light of the teachings within the technical scope of the appended claims. It is therefore to be understood that, the disclosure of this patent specification may be practiced otherwise by those skilled in the art than as specifically described herein, and such, modifications, alternatives are within the technical scope of the appended claims. Such embodiments and variations thereof are included in the scope and gist of the embodiments of the present disclosure and are included in the embodiments described in claims and the equivalent scope thereof.

The effects described in the embodiments of this disclosure are listed as the examples of preferable effects derived from this disclosure, and therefore are not intended to limit to the embodiments of this disclosure.

The embodiments described above are presented as an example to implement this disclosure. The embodiments described above are not intended to limit the scope of the invention. These novel embodiments can be implemented in various other forms, and various omissions, replacements, or changes can be made without departing from the gist of the invention. These embodiments and their variations are included in the scope and gist of this disclosure and are included in the scope of the invention recited in the claims and its equivalent.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. An image forming apparatus comprising:
circuitry configured to cause the apparatus to
  feed a two-ply sheet from a first feed tray, the two-ply sheet including two sheets overlapped and bonded together at one end as a bonding portion of the two-ply sheet,
  separate a non-bonding portion of the two-ply sheet,
  start feeding an inner sheet from a second feed tray, different from the first feed tray, before completion of the sheet separating operation on the two-ply sheet,
  form an image on a surface of the inner sheet, and
  insert the inner sheet between the separated two sheets of the two-ply sheet.

2. The image forming apparatus according to claim 1, further comprising a sheet separation sensor configured to detect a state in which the non-bonding portion of the two-ply sheet is separated,
  wherein the circuitry is configured to cause the apparatus to start feeding the inner sheet based on a detection result of the sheet separation sensor.

3. The image forming apparatus according to claim 1, wherein the circuitry is configured to cause the apparatus to:
  start feeding the inner sheet from the second feed tray after a set time has elapsed from the start of feeding the two-ply sheet, the set time corresponding to a size of the two-ply sheet in a sheet conveyance direction.

4. The image forming apparatus according to claim 1, further comprising a housing including the image forming apparatus,
wherein the circuitry is configured to select a regular print mode to cause the image forming apparatus to:
feed a sheet from the second feed tray without feeding the two-ply sheet from the first feed tray;
print an image on a surface of the sheet; and
eject the sheet to an outside of the housing.

5. The image forming apparatus according to claim 1, further comprising:
a document reading device configured to read image information of an original document; and
a sheet separation device configured to perform the sheet separating operation,
wherein the document reading device is disposed above the image forming apparatus with a space, and
wherein the sheet separation device is disposed in the space between the document reading device and the image forming device.

6. The image forming apparatus according to claim 1, further comprising a sheet separation device for separating the two-ply sheet, the sheet separation device including:
a winding roller configured to rotate in a rotational direction to wind the two-ply sheet;
a conveyance roller pair configured to convey the two-ply sheet, with an opposite end opposite the one end of the two-ply sheet being as a leading end, toward the winding roller in a sheet conveyance passage between the conveyance roller pair and the winding roller;
a separator configured to insert into a gap formed in the non-bonding portion between the two sheets of the two-ply sheet at a position between the winding roller and the conveyance roller pair, with respect to the two-ply sheet in a state in which the two-ply sheet is wound from the opposite end of the two-ply sheet by the winding roller and the one end of the two-ply sheet is nipped by the conveyance roller pair;
two branched sheet conveyance passages branching off in different directions from the sheet conveyance passage interposed between the two branched sheet conveyance passages; and
a switcher configured to guide the two sheets separated by the separator, to the two branched sheet conveyance passages, respectively.

7. The image forming apparatus according to claim 6, wherein the circuitry is configured to:
cause the conveyance roller pair to convey the two-ply sheet toward the one end of the two-ply sheet to release winding of the opposite end of the two-ply sheet on the winding roller after the separator is inserted into the gap;
cause the conveyance roller pair to convey the two-ply sheet toward the opposite end of the two-ply sheet;
cause the switcher to guide the two sheets separated by the separator, to the two branched sheet conveyance passages separately; and
cause the conveyance roller pair to convey the inner sheet toward the one end of the two-ply sheet in the sheet conveyance passage, to insert the inner sheet between the two sheets of the two-ply sheet separated from each other.

8. The image forming apparatus according to claim 1, further comprising a sheet lamination device configured to perform a sheet laminating operation on the two-ply sheet in which the inner sheet is inserted between the two sheets.

9. An image forming system comprising:
the image forming apparatus according to claim 1 including a housing,
the housing including
the image forming device; and
a sheet separation device including separator and a sheet feeder,
the sheet separation device being detachably attached to the image forming apparatus.

10. The image forming system according to claim 9,
wherein the sheet separation device includes a sheet lamination device configured to perform a sheet laminating operation on the two-ply sheet in which the inner sheet is inserted between the two sheets separated by the sheet separation device.

11. The image forming apparatus according to claim 1, further comprising a sheet separation device for separating the two-ply sheet, the sheet separation device including a pair of separation claws.

12. The image forming apparatus according to claim 11, wherein a vertical length of each separation claw, of the pair of separation claws, gradually increases, in a vertical direction, from a tip of the separation claw to a rear end of the separation claw.

13. The image forming apparatus according to claim 11, wherein the circuitry is configured to cause the separation claws to:
insert into a gap in the two-ply sheet;
relatively move from the one end of the two-ply sheet to the other end of the two-ply sheet; and
move in a width direction between the sheets of the two-ply sheet at the other end of the two-ply sheet.

14. The image forming apparatus according to claim 11, wherein the pair of separation claws are further configured to:
guide a first sheet of the two-ply sheet to a first conveyance passage; and
guide a second sheet of the two-ply sheet to a second conveyance passage, different from the first conveyance passage.

15. The image forming apparatus according to claim 1, wherein the circuitry is further configured to cause the image forming apparatus to:
form a gap between the two sheets of the two-ply sheet by winding the two-ply sheet around a roller.

16. The image forming apparatus according to claim 15, wherein the circuitry is further configured to cause the image forming apparatus to:
determine whether the gap is large enough to perform a separation of the two-ply sheet based on an abnormality sensor.

17. The image forming apparatus according to claim 16, wherein the abnormality sensor is a lever type sensor.

* * * * *